United States Patent
Von Gal, Jr. et al.

[15] 3,682,338
[45] Aug. 8, 1972

[54] COMBINATION DEPALLETIZER AND PALLETIZER

[72] Inventors: George E. Von Gal, Jr., 3408 Thomas Ave.; Mabry S. Phillips, 3144 Woodfern Drive; Lawrence A. Hutchinson, 3431 Cloverdale Road, all of Montgomery, Ala. 36100

[22] Filed: Nov. 4, 1969

[21] Appl. No.: 873,896

[52] U.S. Cl.....................214/8.5 D, 198/32, 214/6 P
[51] Int. Cl.............................................B65g 59/04
[58] Field of Search...214/6 M, 6 P, 6 FS, 8.5, 8.5 A, 214/8.5 C, 8.5 D

[56] References Cited

UNITED STATES PATENTS

| | | | |
|---|---|---|---|
| 2,524,846 | 10/1950 | Socke et al............214/6 M X |
| 2,822,933 | 2/1958 | Pagdin....................214/8.5 D |
| 3,038,615 | 6/1962 | Roth et al................214/8.5 A |
| 3,107,794 | 10/1963 | Bechtold et al.........214/8.5 A |
| 3,180,499 | 4/1965 | Wildheim et al........214/8.5 A |
| 3,215,289 | 11/1965 | Gleason..................214/8.5 A |
| 3,263,829 | 8/1966 | Verrinder et al. ......214/8.5 A |
| 3,342,349 | 9/1967 | Sheldon et al. .........214/8.5 C |
| 3,431,698 | 3/1969 | Bathellier...........214/6 M UX |
| 3,471,036 | 10/1969 | Thomas et al.............214/6 M |
| 3,517,831 | 6/1970 | Hahn.................214/8.5 C UX |

FOREIGN PATENTS OR APPLICATIONS 896,425    5/1962    Great Britain ............214/6 M

*Primary Examiner*—Robert J. Spar
*Attorney*—Newton, Hopkins & Ormsby

[57] ABSTRACT

This invention relates to an automatic palletizer system and a conveyor system for use in handling a multiplicity of articles. More particularly this invention includes a depalletizer for effecting the removal of a layer of articles such as cans, from a loaded pallet and transferring said layer of articles to a receiving conveyor. The depalletized articles are then conveyed from the depalletizer to a labeling machine wherein information contained on a label is applied to the article. After the labeled article leaves the labeling machine, the article is conveyed to a packaging machine for placing a series of the articles into a box-like container. The container and the series of articles are then conveyed to a palletizer wherein the containers are arranged in a predetermined pattern and transferred to a receiving pallet to form a series of layers of containers. The depalletizer of the present invention includes a loaded pallet elevator for effecting movement of a loaded pallet to a transfer means whereby a layer of articles are transferred therefrom. A receiving conveyor means is located adjacent said loaded pallet elevator for receiving a layer of articles transferred from the loaded pallet. Located on an opposite side of said elevator from the receiving conveyor is a slip-sheet storage bin for receiving slip-sheets as they are removed from the loaded pallet. The receiving conveyor means includes a series of conveyors for effecting a transfer of a layer of articles successively from movement along a first predetermined path in a transverse array to a second predetermined path whereby the articles are moved individually to the labeling machine. The transfer means for effecting a transfer of a slip-sheet from the loaded pallet to the storage bin includes a series of suction cups. The transfer means for transferring a layer of articles from the loaded pallet to the receiving conveyor includes a magnetic pick up head. A pallet magazine is supported on the system beneath the slip-sheet storage bin and between the loaded pallet elevator and an elevator for the container palletizer, whereby an empty pallet from the depalletizer may be transferred directly to the container palletizer or may be transferred to the pallet magazine for storage. However, should an empty pallet not be available from the depalletizer as required by the container palletizer, the magazine is detail for dispensing a pallet therefrom to the container palletizer.

7 Claims, 23 Drawing Figures

United States Patent
Von Gal, Jr. et al.
[15] 3,682,338
[45] Aug. 8, 1972
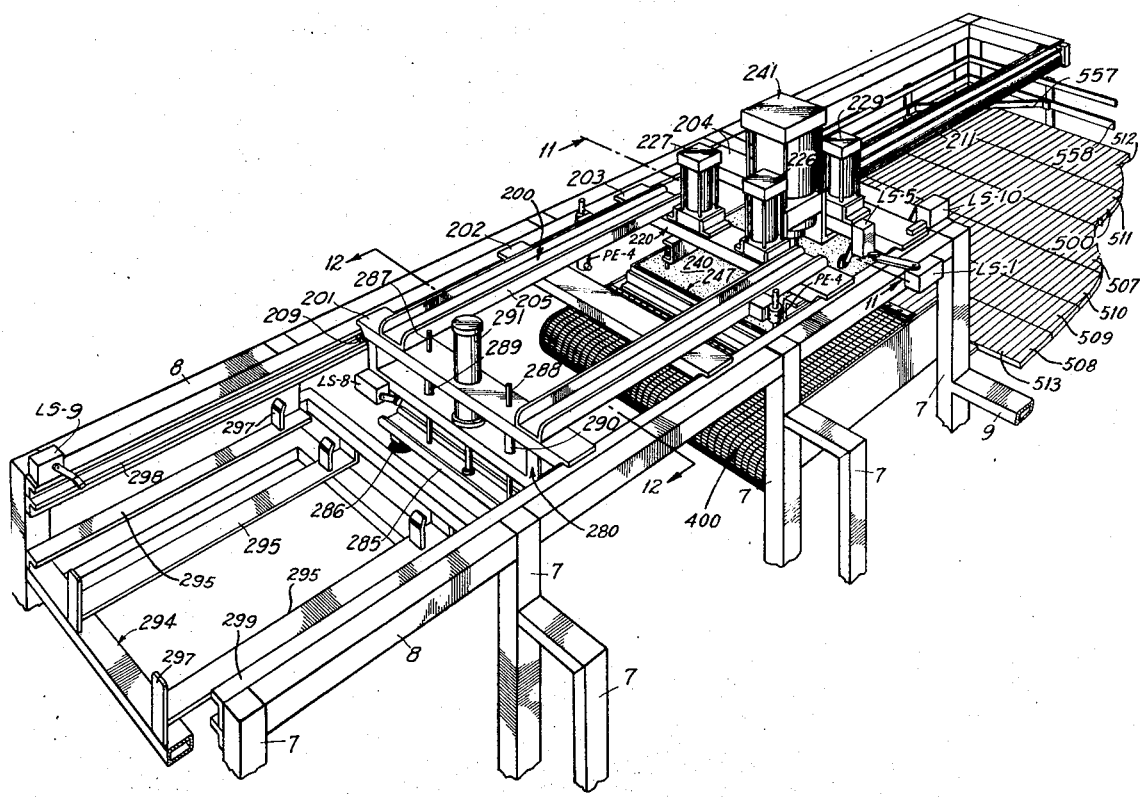

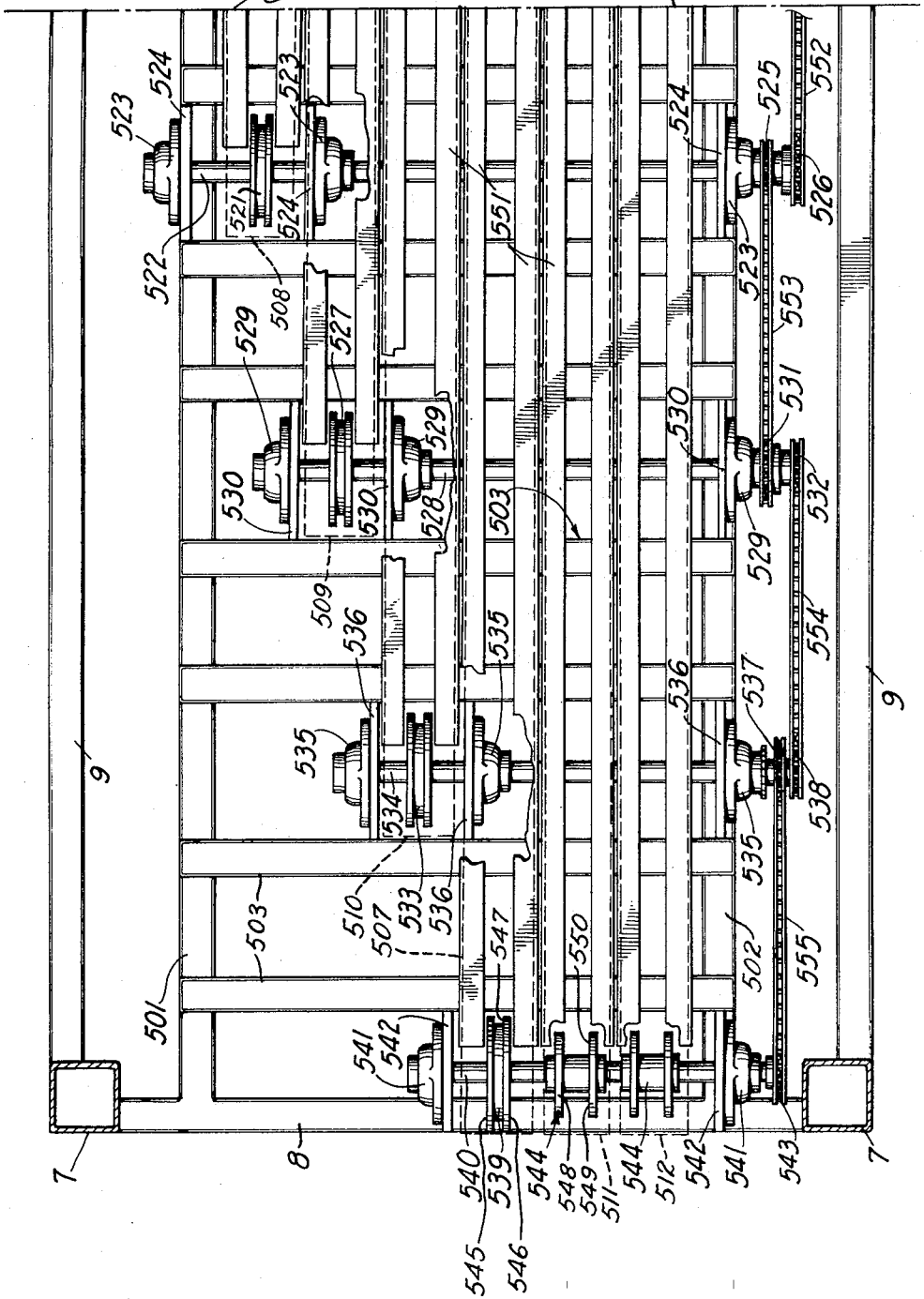

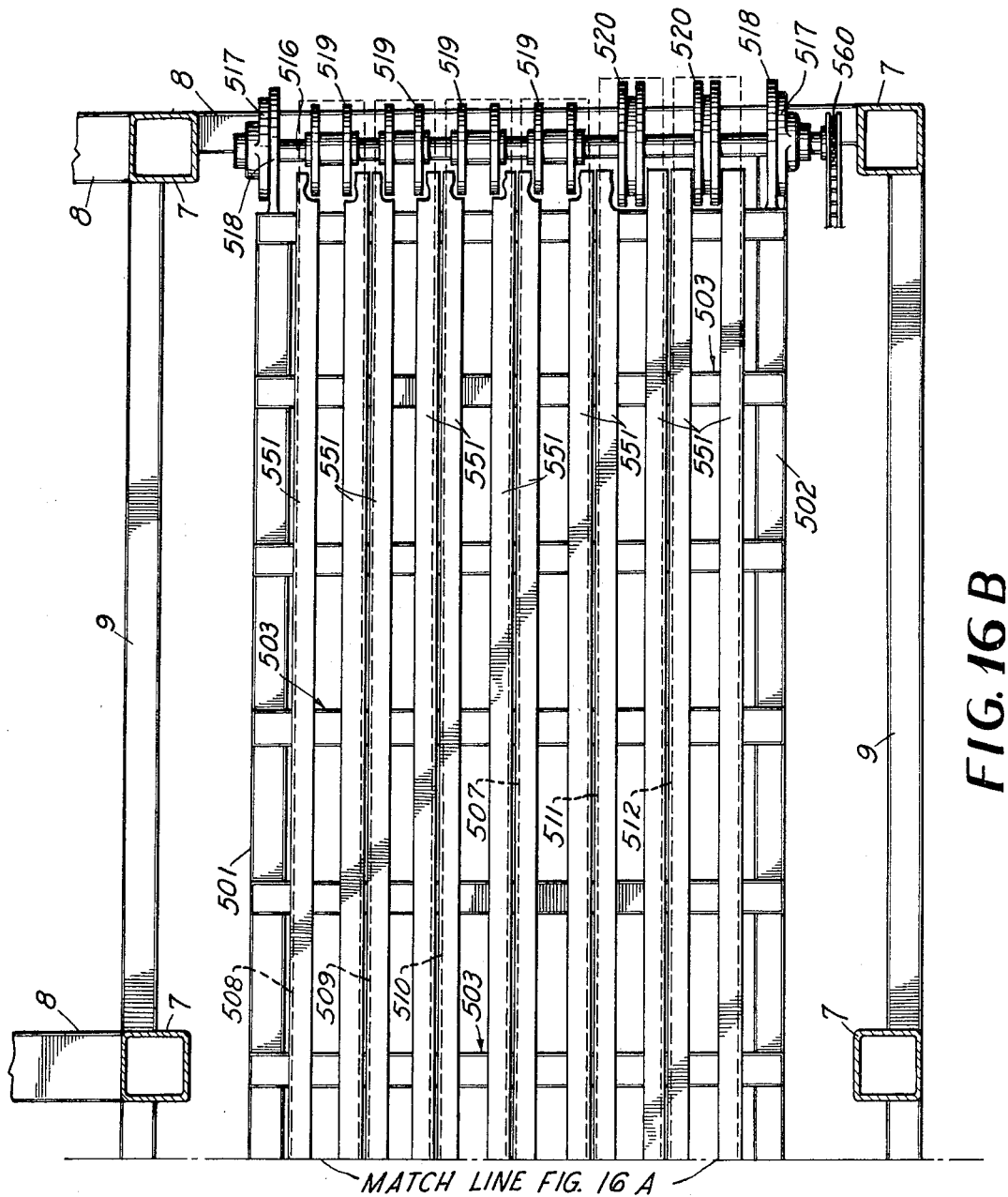

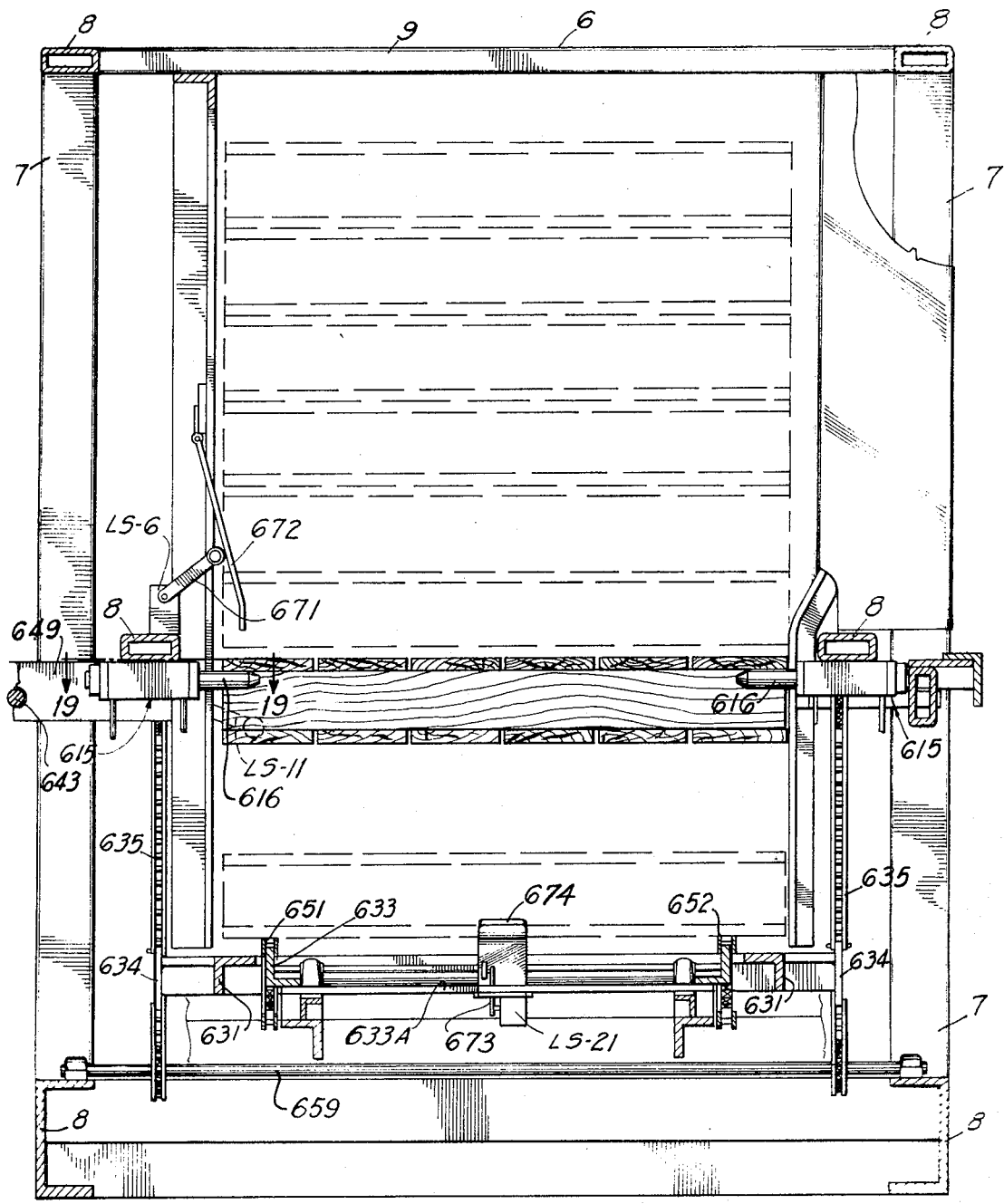
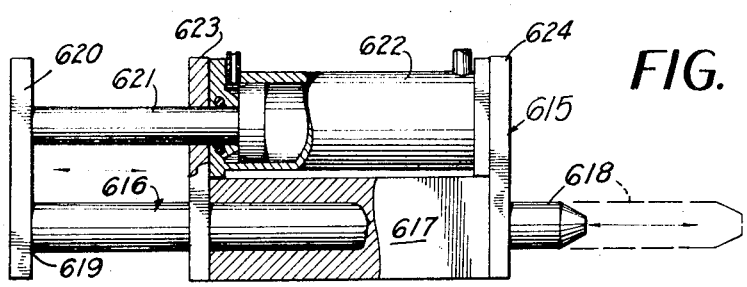
FIG. 18
FIG. 19

COMBINATION DEPALLETIZER AND PALLETIZER

BACKGROUND OF THE INVENTION

In the handling of a multiplicity of articles such as cans, it is often necessary to effect a storage of a product in a can during a seasonal period of time. After the product has been placed in the can, the can is arranged in layers in a predetermined pattern and placed on a pallet for storage. It often becomes necessary to remove a selected number of said cans from storage, place a label on the cans in a container and then place a series of containers on another pallet for shipment.

In the past, there have been numerous attempts to provide automatic systems for handling cans. In most of the prior art depalletizing systems, means were provided for transferring a layer of articles from a pallet. However, the removal of a slip-sheet separating the series of layers of cans was often removed by hand. Further, the transfer means for effecting a removal of a layer of cans from a pallet was complicated in construction and unreliable in operation. After a layer of cans had been removed from a pallet, it was necessary to manually separate the individual cans from a layer of cans for feeding to a canned labeling machine.

There have been numerous attempts to construct an automatic depalletizer and an automatic palletizer. However, the prior art depalletizer required a pallet magazine for receiving empty pallets removed from the depalletizer and the palletizer required a separate magazine for dispensing empty pallets individually to the palletizer as required.

SUMMARY OF THE INVENTION

It is therefore a primary object of this invention to provide an automatic system for use in removing unlabeled cans from a storage pallet, placing a label on the can, placing the labeled can in a container and transferring a series of containers to a storage pallet.

It is a further object of this invention to provide a depalletizer for use in effecting a transfer of a layer of articles automatically from a loaded pallet onto a receiving conveyor means.

It is a still further object of this invention to provide an automatic depalletizer for transferring a slip-sheet separating a series of layers of articles from a loaded pallet into a slip sheet storage bin.

A still further object of this invention is to provide a depalletizer for effecting a movement of a transverse array of dpalletized articles moving along a first predetermined path to a single row of articles moving along a second predetermined path.

Another object of this invention is to provide a combination depalletizer and palletizer system utilizing a common pallet storage means.

A still further object of this invention is to provide a depalletizer system including a movable carriage supported for operative movement from a position over a loaded pallet to a position over an article receiving means.

A further object of this invention is to provide a depalletizer including a movable carriage supported for movement from a loaded pallet to a position over a slip-sheet storage bin.

Still another object of this invention is to provide an article transfer system which utilizes a permanent magnet pick up head.

Another object of this invention is to provide a depalletizer utilizing a series of suction cups for transferring a layer separator slip-sheet to a storage bin.

A further object of this invention is to provide a conveying system for moving a series of articles arranged in a transverse array along a first predetermined path and for transferring said transverse a-ray of articles to a single row of articles for successive movement along a second predetermined path.

A still further object of this invention is to provide a method of handling a multiplicity of articles for operation thereon at a plurality of stations.

An additional object of this invention is to provide an automatic article handling system which is simple construction ecconomical to manufacture, and reliable in operation.

Still other objects and advantages in the details of construction will become apparent after reading the following description of one illustrated embodiment of the invention, with reference to the attached drawings wherein like reference characters have been used to refer to like parts throughout the several figures of drawing.

BRIEF DESCRIPTION OF THE DRAWINGS

FIGS. 16A and 16B are enlarged top-plan views of the unscrambling conveyor mechanism, with certain parts being omitted for purposes of clarity.

FIG. 18 is an enlarged fragmentary vertical sectional view as would be seen along lines 18—18 of FIG. 3.

FIG. 19 is an enlarged sectional view taken along lines 19—19 of FIG. 18, with certain parts omitted and certain parts broken away and shown in section for purposes of clarity.

DESCRIPTION OF ILLUSTRATIVE EMBODIMENTS

GENERAL DESCRIPTION

Figure 1:
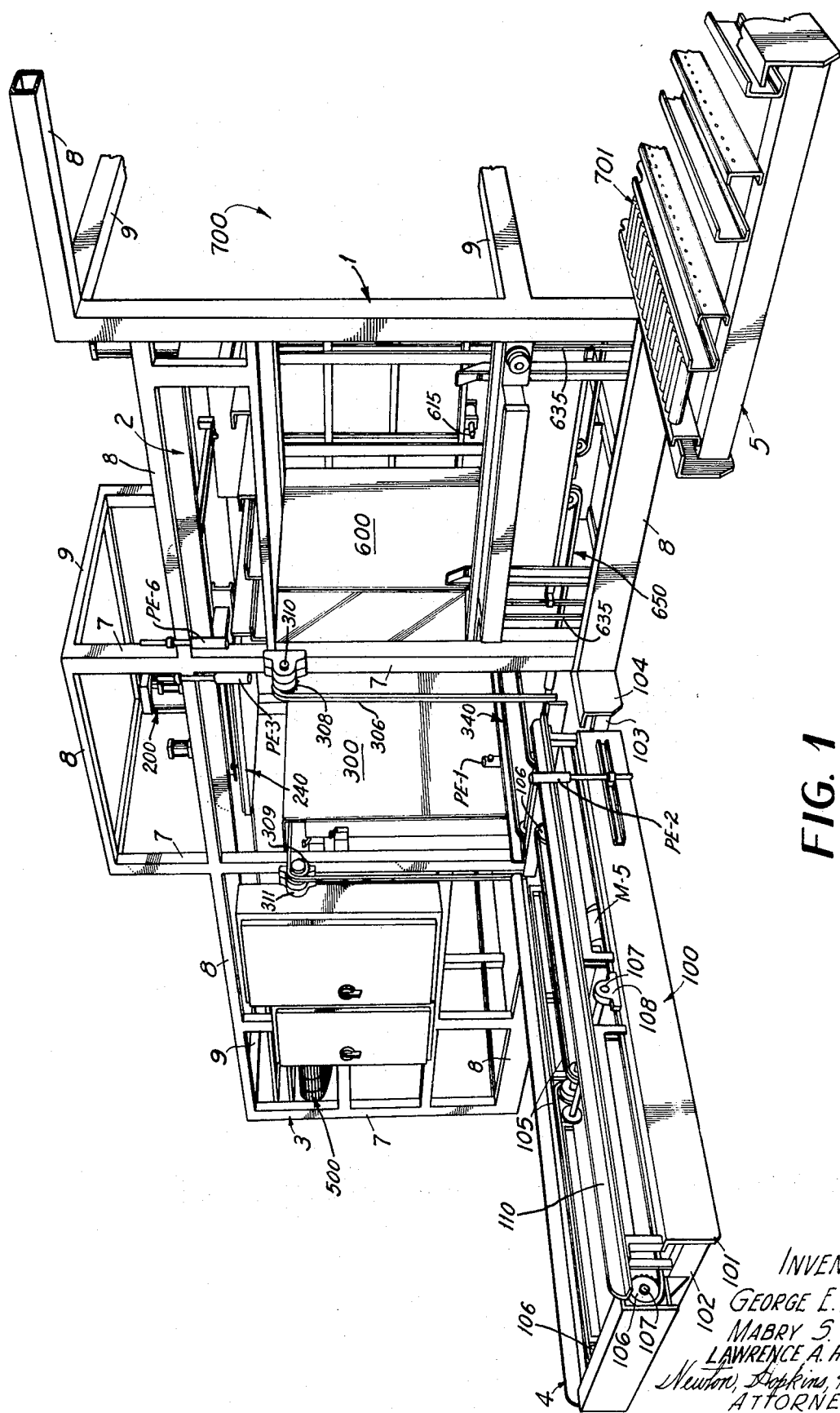
FIG. 1 is a right front fragmentary perspective view of the combination palletizing unit.

The combination case palletizer and can depalletizer is completely automatic in operation and does not require the continuous service of an operator. The case palletizer will operate continuously as long as the loaded pallets are removed from the discharge conveyor, and the pallet magazine is kept stocked with empty pallets. The can depalletizer will operate continuously as long as a supply of loaded pallets is on the infeed conveyor, the slip-sheet and pallets are removed, and the cans are removed from the machine. If the case palletizer and can depalletizer are both operating, pallets will only have to be added to the pallet magazine occasionally since the empty pallets from the depalletizer will be transferred to the pallet magazine for use in the case palletizer as required. In the event either of these above functions is not carried machine promptly, the machine will stop itself automatically.

The combination machine is a sequence operation machine which performs only when a continuous flow of products is fed to it. It is not dependent on any complicated timing devices for proper operation. It can be stopped and restarted at any point during the loading or unloading cycle. It is equipped with sufficient safety cut-off switches to prevent jamming, overloading, hang-ups, etc., caused by defective or non-uniform cases, cans, or pallets, or the malfunction of any components within the machine.

The automatic combination unit is mechanically, hydraulically and pneumatically operated and electrically controlled.

Referring now to the drawings, the combination palletizer and depalletizer will be described with reference to a supporting framework 1, a loaded pallet and infeed section 100, a layer can and slip-sheet transfer means 200, a loaded pallet elevator mechanism 300, a depalletized layer can receiving conveyor 400, an unscrambling conveyor mechanism 500, a pallet magazine 600, and a case palletizer 700.

The general function of the combination can depalletizer and case palletizer is to remove cans from a loaded pallet which have been in storage and successively separate each can contained on a pallet, transfer the cans individually to a machine for processing, such as applying a label to the can, transfer the processed cans to a packaging machine for inserting the cans in a case and then transfer the case of cans to the case palletizer for arranging the cases in a predetermined pattern and stacking layers of cases on a second pallet for further handling, such as shipment.

The can labeling machine and the case package machine are of conventional structure and are only shown on the drawing in block diagrams, since the labeling machine and the case packaging machine form no part of the present invention.

SUPPORT FRAMEWORK

The combination depalletizer unit and case palletizing unit is constructed of heavy structural steel members welded into a rugged, compact frame. All components such as bearings, chains, sprockets, switches, electrical motors, etc., are of conventional construction which are readily available.

Figure 2:
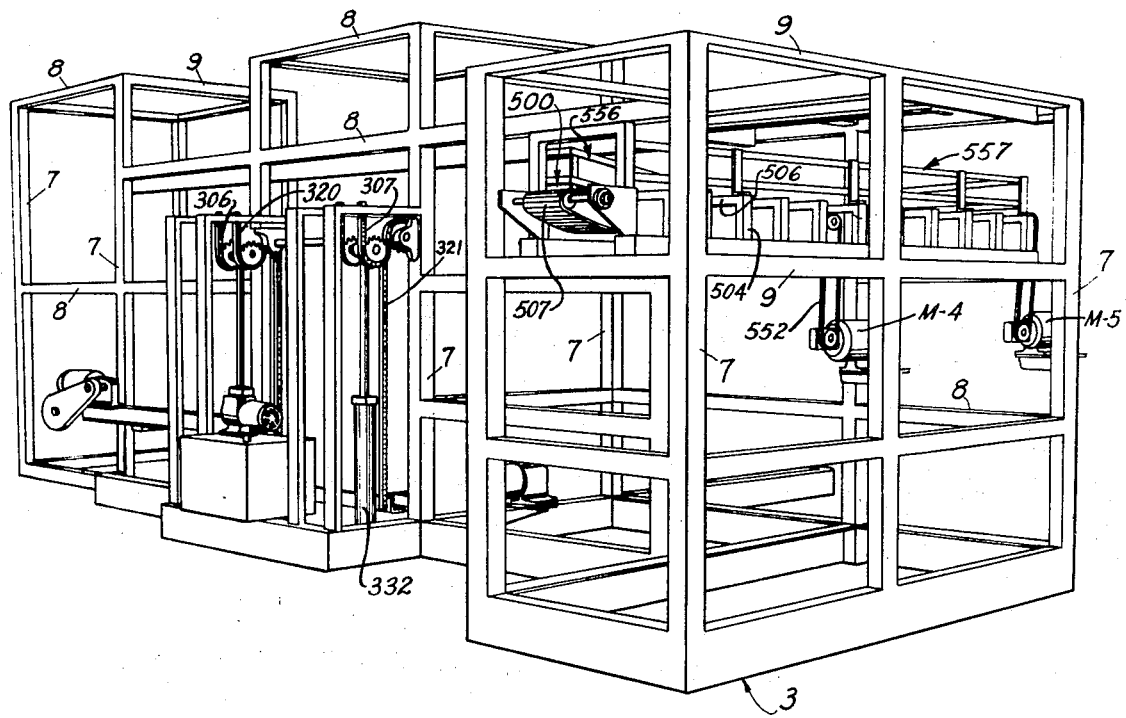
FIG. 2 is a perspective view as seen from the right rear of the combination unit shown in FIG. 1.
Figure 3:
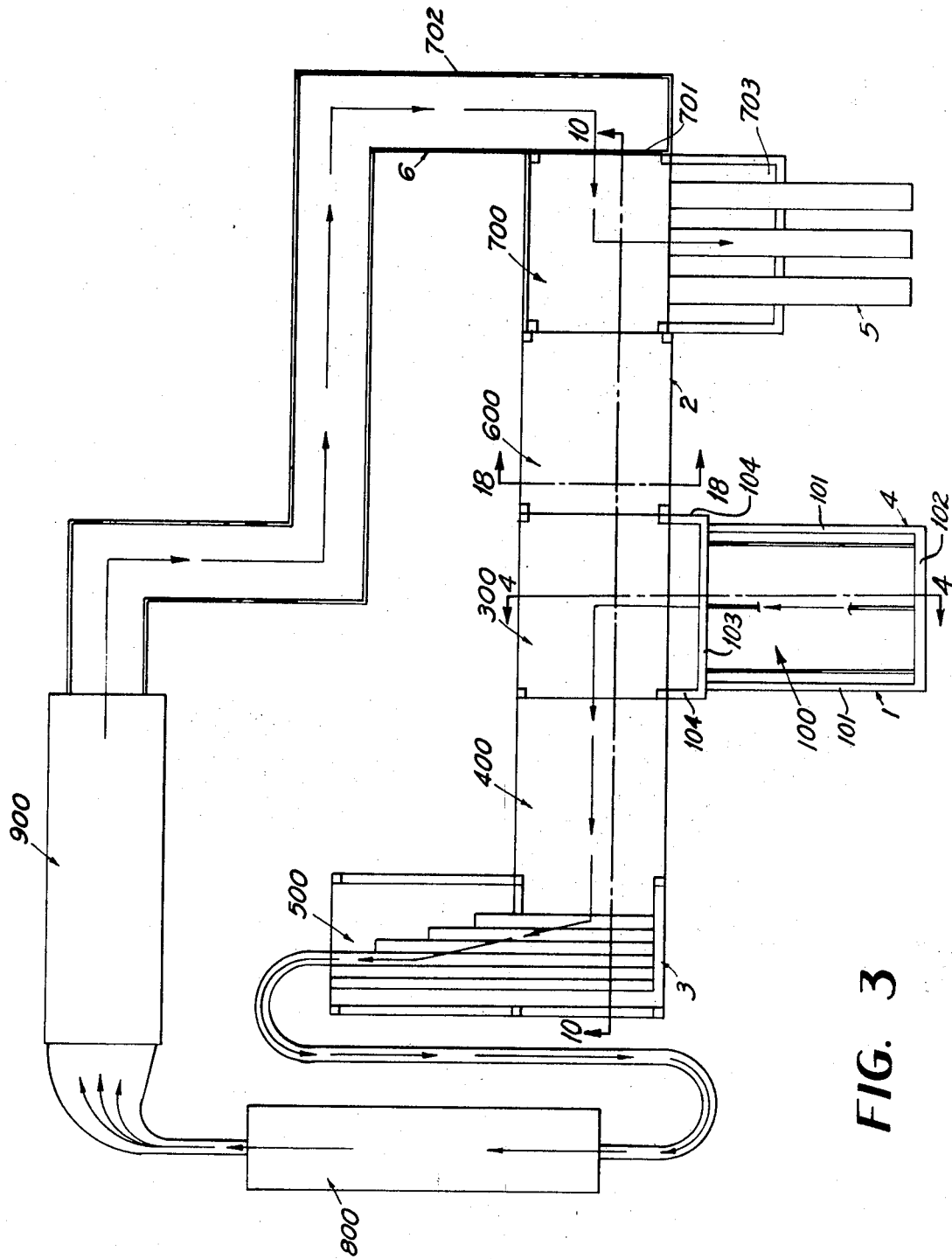
FIG. 3 is a top schematic of the combination palletizer unit showing the relationship of the palletizer unit to a canned labeling means and a container packaging means.

As shown in FIGS. 1–3, the support framework 1 includes a substantially elongated main body portion 2 which supports the major portion of the mechanism for effecting the palletizing and depalletizing operation. Projecting laterally outward from the elongated main body portion 2 is a series of support frameworks which support varied mechanisms related to the operation of the combination palletizer unit. As shown on the left in FIGS. 1 and 3, the first laterally projecting framework 3 is detailed for supporting a conveyor system 500 designed to unscramble the cans contained in a layer and for transferring the cans individually in a single row away from the elongated main body portion. Located intermediate the elongated body portion and projecting laterally outward on the opposite side of an elongated body portion from the first projection frame 3 is a second support framework 4. The support framework 4 is detailed for supporting an infeed conveyor 100 designed to convey a loaded pallet into the depalletizing elevator 300.

Located on the right end of the elongated main body portion 2 is a third projecting framework 5. The support framework 5 is designed in construction for supporting a loaded pallet which has been palletized and conveyed outwardly from the case palletizer 700. Projecting laterally outward on an opposite side from the support framework 5 is a fourth projecting framework 6. The laterally projecting framework 6 is designed in construction for supporting an infeed conveyor which conveys cases of cans to the palletizing unit 700.

The elongated main body portion 2 of the support framework includes a series of vertically oriented post elements 7, a series of horizontal, longitudinally extending members 8 and a series of horizontally oriented transversely extending cross-connecting frame members 9. The reference characters 7, and and 9, will be used to refer to all of the vertically extending post elements, horizontally arranged and longitudinally extending support members, and transverse cross connecting members, respectively. The remainder of the support framework which is detailed for supporting various component mechanisms of the combination unit will be described hereinbelow in the section of the description of the apparatus which relates to the associated function of a particular component.

LOADED PALLET INFEED CONVEYOR

The loaded pallet infeed conveyor is supported adjacent the depalletizer in such a manner that the loaded pallet infeed conveyor has a discharge end detailed in pallet transferring relationship relative to a pallet conveyor located within the pallet elevator. The function of the loaded pallet infeed conveyor is to effect a transfer of a loaded pallet from the pallet infeed conveyor to the pallet elevator of the depalletizer. The loaded pallet infeed conveyor includes a support framework consisting of a pair of fore and aft extending beams 101, which are connected together in parallel laterally spaced relationship by a series of cross connecting beams 102, only one of which can be seen on the drawing. The rearmost cross connecting beam as shown in FIG. 1, includes a pair of laterally extending end portions 103, only one of which is shown. The laterally extending end portions 103 are connected to the main palletizing framework by a pair of support brackets 104.

Mounted on the support framework 101, 102, etc. is a conveyor mechanism which consists of three laterally spaced endless chains 105 (only two of which are shown in FIG. 1). The endless chains 105 are supported in a horizontally disposed relationship by means of a series of sprockets 106. The sprockets 106 are fixed to shafts 107. Shafts 107 are rotatably supported by conventional bearing blocks 108. A drive for effecting rotation of the endless chains 105 is provided by a conventional power motor means M5 which is mounted intermediate the conveyors as shown in FIG. 1. The driving connection between the power motor means M5 and the endless conveyor 105 includes a conventional sprocket and chain arrangement (not shown). As longitudinally extending pallet guide bar 110 is supported adjacent each side edge of the endless chains 105 as shown in FIG. 1, by the support framework 101 in a conventional manner (not shown).

As shown in FIG. 1, the pallet endless chain conveyors 105 are provided with a control means for effecting operation of the motor M5. The control means includes a photoelectric switch PE-8 mounted adjacent the discharge end of the endless conveyors. The upper run of pallet endless conveyors 105 are detailed in supporting relationship to be substantially coplanar with the upper run of endless conveyor means of the pallet elevator, whereby a loaded pallet can be transferred smoothly from the loaded pallet conveyor to the loaded pallet elevator without disturbing cans supported thereon.

The above described conveyor controls and the sequence of operation of the conveyor controls as it relates to the other palletizer controls will be described herein below in the operation.

CAN LAYER AND SLIP-SHEET TRANSFER ASSEMBLY

The function of the can layer transfer assembly 200 is to effect a transfer of layers of cans from a loaded pallet to a receiving conveyor 400 in successive order. The function of the slip-sheet transfer assembly is to effect a transfer of a layer separator slip-sheet from a top the cans on a loaded pallet to the slip-sheet storage bin.

Figure 9:
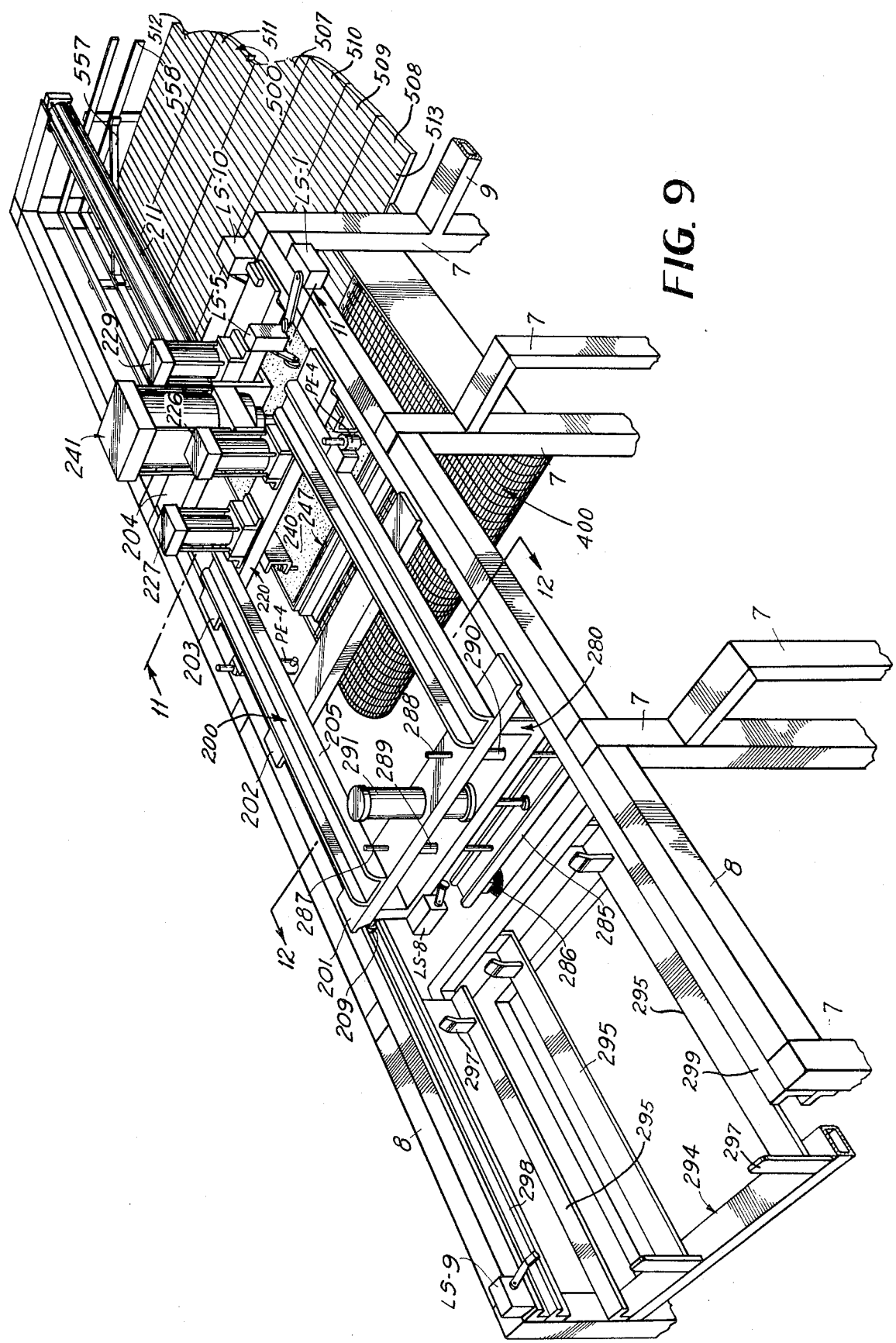
FIG. 9 is an enlarged fragmentary perspective view showing the layer can and slip-sheet transfer assembly, with certain parts omitted for purposes of clarity.
Figure 10:
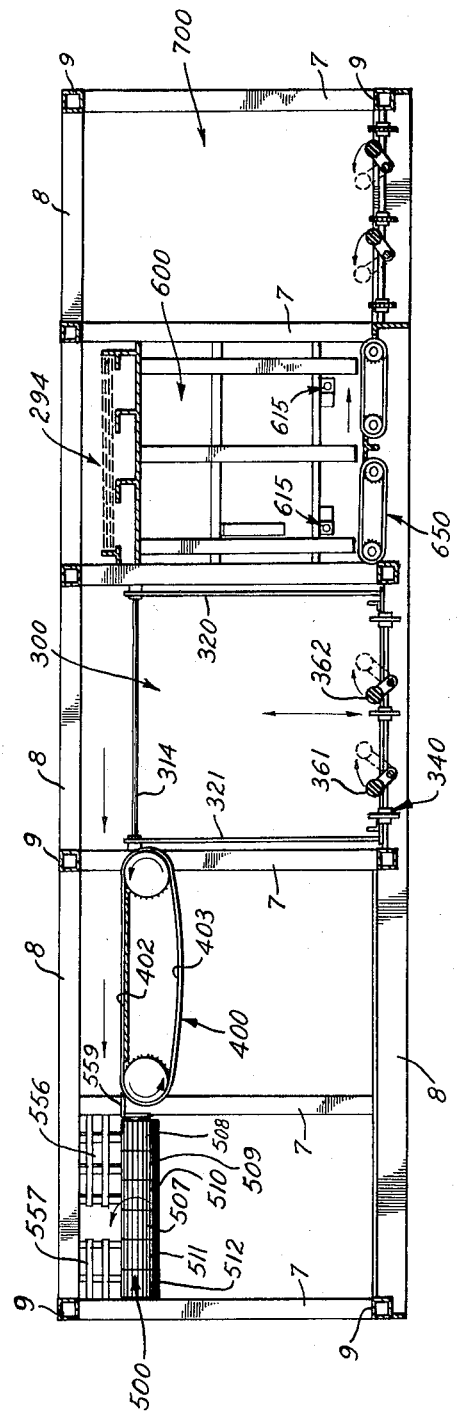
FIG. 10 is a longitudinal vertical sectional view as would be seen along lines 10 — 10 of FIG. 3, with certain parts being omitted for purposes of clarity.
Figure 11:
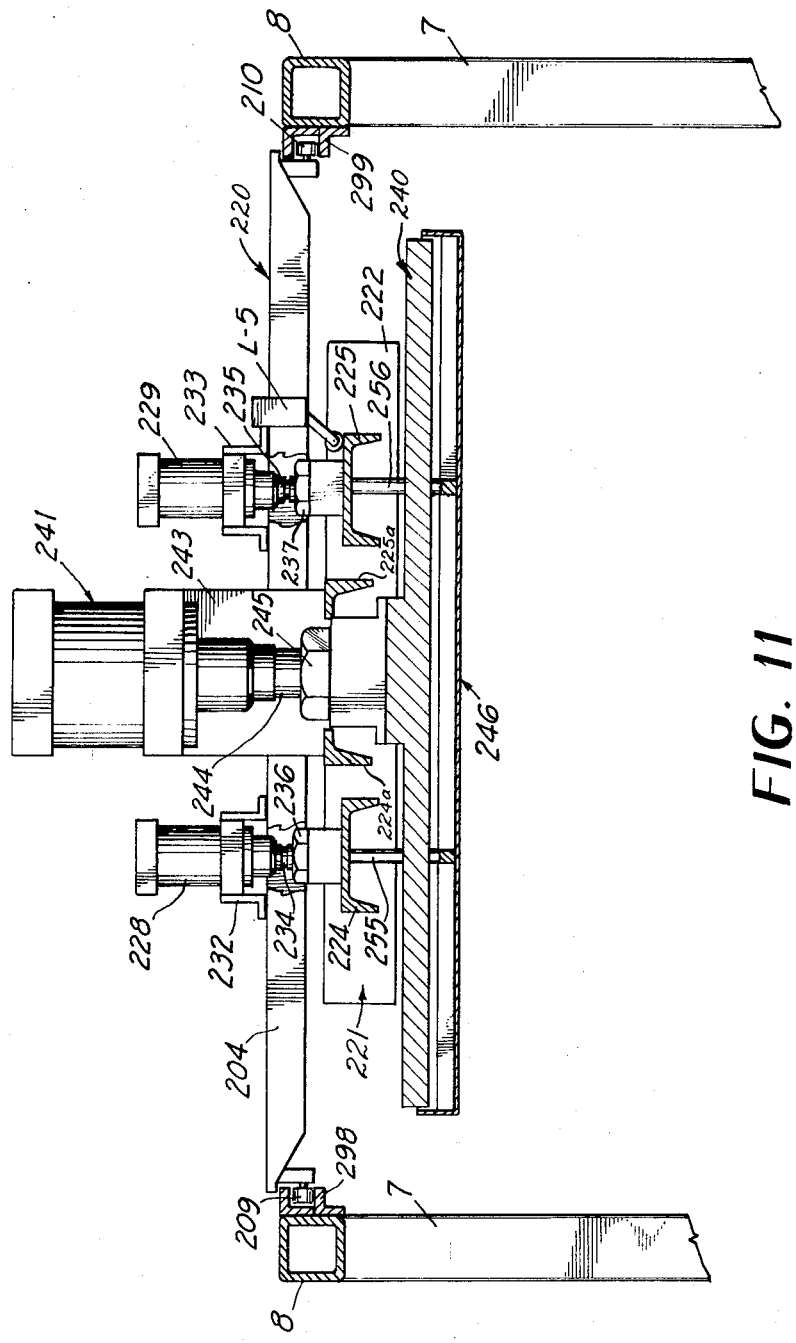
FIG. 11 is an enlarged vertical sectional view taken along lines 11 — 11 of FIG. 9.
Figure 12:
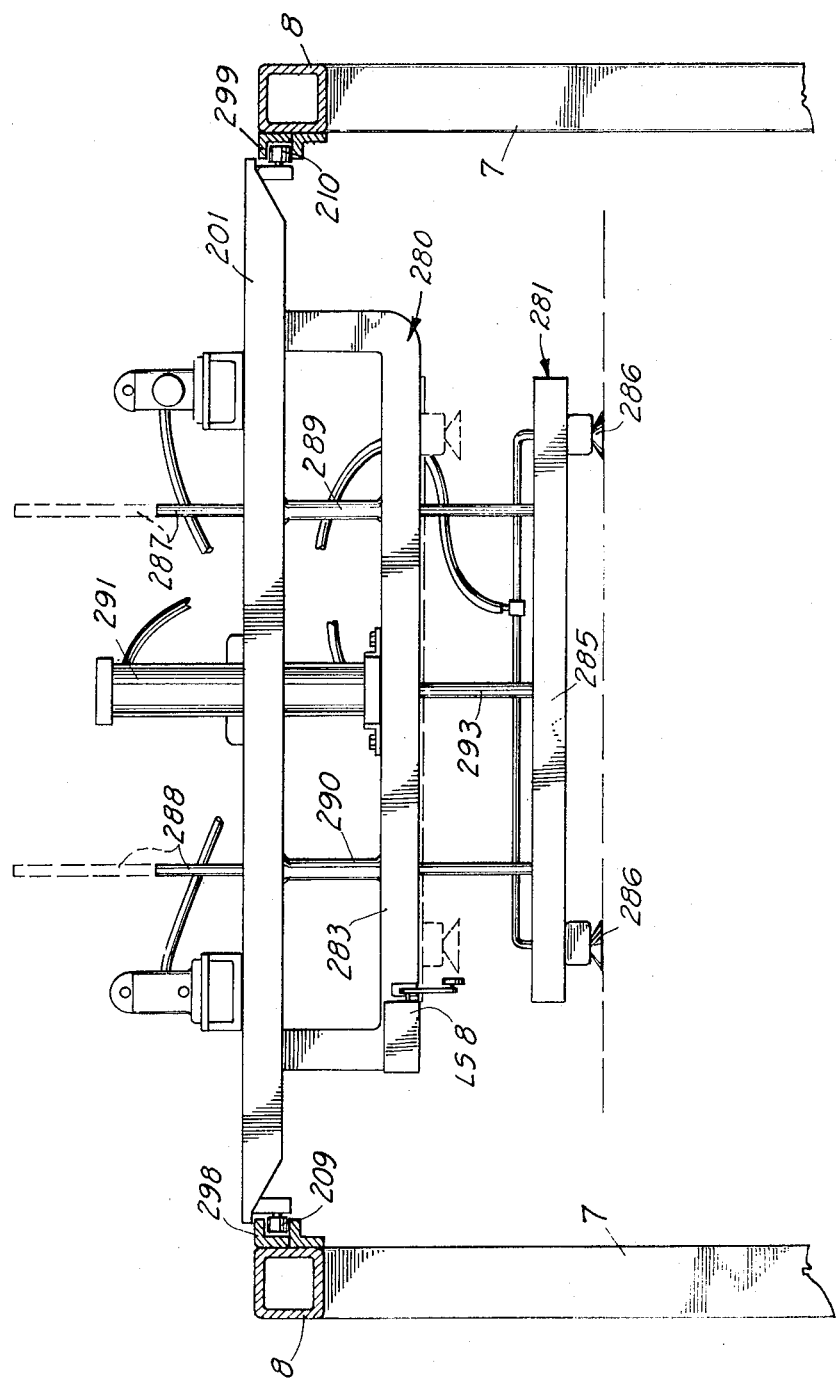
FIG. 12 is an enlarged vertical sectional view taken along lines 12 — 12 of FIG. 9, with certain parts omitted for purposes of clarity.
Figure 13:
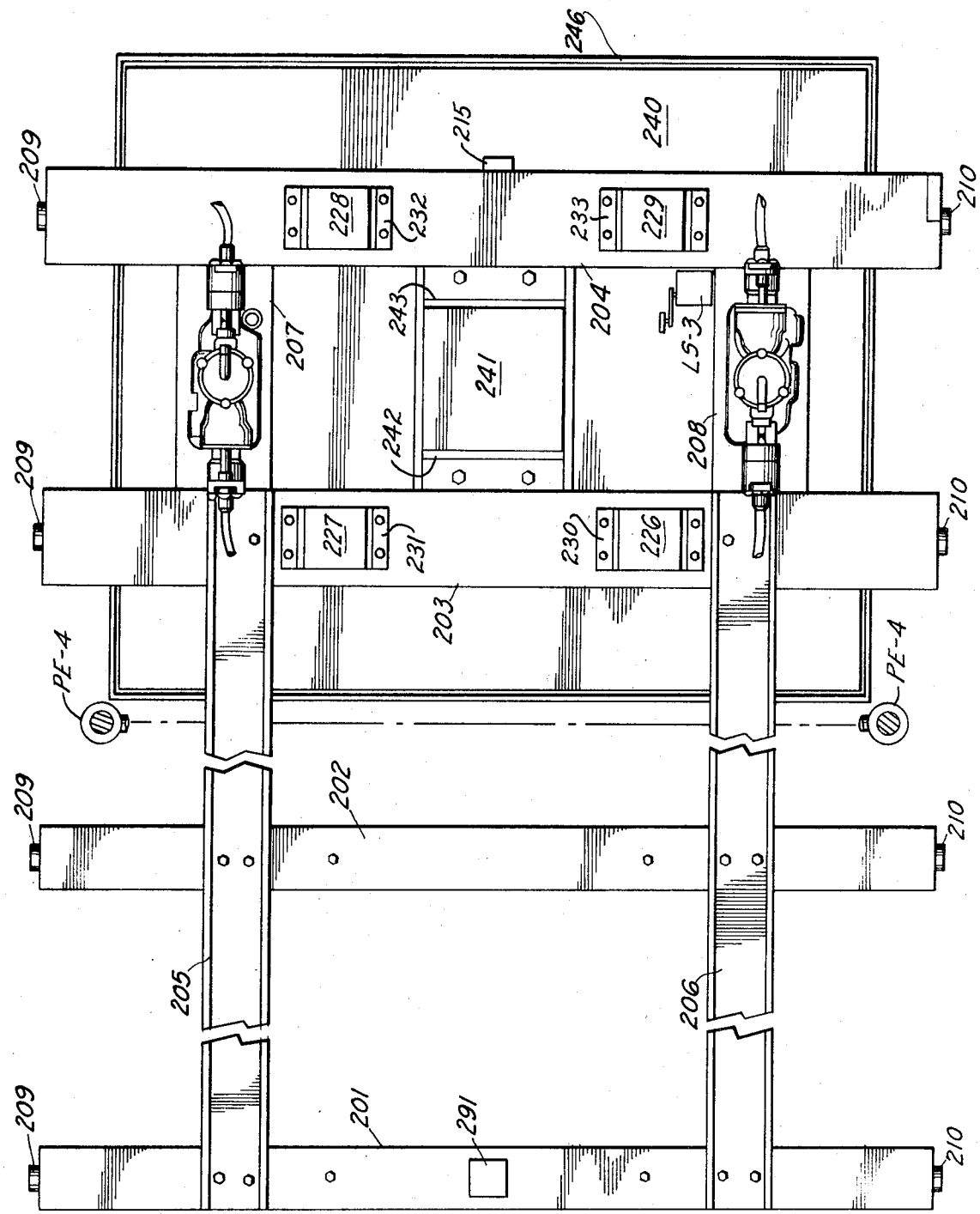
FIG. 13 is an enlarged top-plan view of the movable carriage support means.

Referring to FIGS. 9-14 of the drawing, the can layer and slip-sheet transfer assembly will be described with reference to a support carriage 200, a can layer transfer mechanism 220, and a slip-sheet transfer mechanism 280. As shown in FIGS. 9 and 13, the support carriage 200 includes a series of spaced runner support members 201, 202, 203, 204. The runners 201-204, are connected together to form a unitary carriage by means of a series of cross connecting beams 205, 206, 207, and 208. The beams 205, 206, are detailed to overlay and connect runners 201, 202, and 203 in parallel spaced relationship. The beams 207, 208, are detailed to fit between runners 203, 204 in substantially coplanar relationship with the runners 203, 204. The beams 205-208 are connected to the runners 201-204 by conventional means such as welding, to provide a unitary carriage consisting of four runners and four cross support beams. Supported on one extended end of each of the runners 201 14 204 is a roller support 209. Connected on an opposite end of each of said runners 201-204 is a second roller support means 210. The rollers 209 and 210 are detailed for rolling engagement within a pair of spaced horizontally supported and aligned guide channels 298, 299, which are supported adjacent the top of the palletizing framework 1, 2, etc., as shown in FIGS. 9 and 12.

The above described carriage and roller support mechanism is supported on the palletizing frame for reciprocating movement within the channel guide tracks 298, 299. Reciprocating movement of the carriage is effected by a pneumatic power control cylinder 211 (FIG. 9). Cylinder 211 is supported on the palletizing frame by means of a pair of cylinder support brackets (not shown). Cylinder 211 includes a moveable rod 212 which is connected at 215 to (FIG. 13) to the carriage support runner 204. It is apparent that by energizing the cylinder 211, the carriage 200 will be moved to the left and laterally along the carriage support runners 298, 299 and by de-energizing the cylinder 211, the carriage 200 will be moved to the right as shown in FIG. 9.

Figure 14:
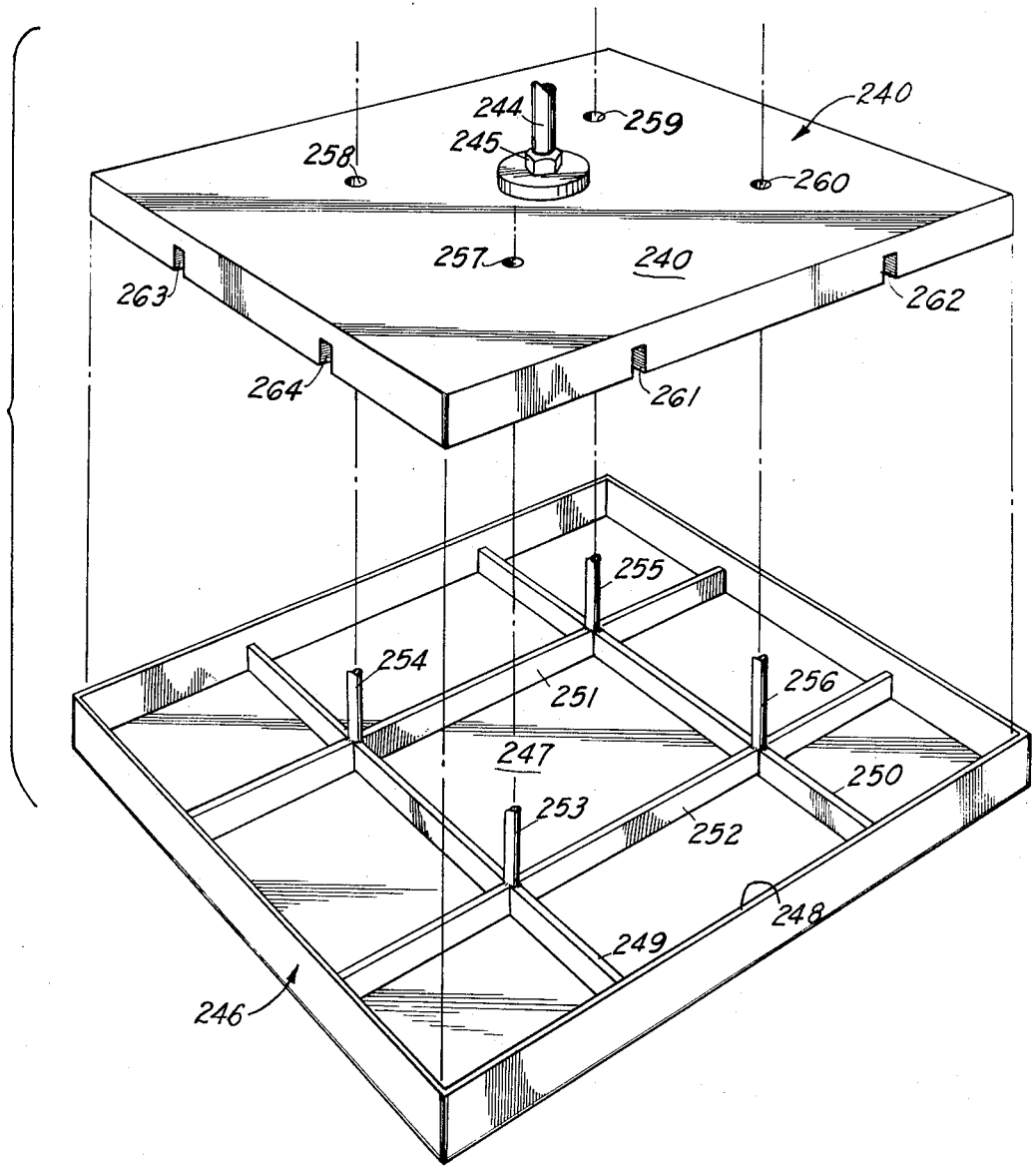
FIG. 14 is an enlarged exploded perspective view of the magnetic pick-up head and a stabilizing pan.

Referring particularly to FIGS. 9, 11 and 13, a can transfer mechanism 220 is mounted on the carriage 200. The can transfer mechanism includes a sub-frame 221. The sub-frame 221 consists of two fore and aft channel shaped runners 222 (only one of which is shown in FIG. 11) connected together in parallel spaced relationship by means of two cross connecting members 224, 225. The two runners 222 and the two cross connecting members 224, 225, are detailed to provide a substantially rectangular shaped sub-frame 221. The sub-frame 221 is supported on the carriage by means of four pneumatic power control cylinders 226, 227, 228, and 229. Each of the cylinders 226-229 is mounted on the carriage 200 by a series of cylinder support brackets 230, 231, 232, and 233, respectively. Each of the cylinders 226-229 includes a piston rod (only two of which are shown in FIG. 10) as 234, 235. The piston rods 234, 235, are connected to the sub-frame 221 by adjustable connecting means 236, 237. Supported on the sub-frame 221 is a permanent magnet pick-up head 240. The magnetic pick-up head is supported on the sub-frame 221 for vertical translating movement by means of a pneumatic power control cylinder 241. The cylinder 241 is supported on the sub-frame 221 by means of a pair of L-shaped support brackets 242, 243. Support brackets 242, 243, are connected to sub-frame cross members 224a, 225a. Thus, it is apparent that the cylinder 241 is held in a fixed position relative to the sub-frame 221. The cylinder 241 includes a conventional reciprocating piston rod 244 which has its extended end connected to the magnetic pick-up head 240 by means of an adjustable connecting means 245. Also supported on the sub-frame 221 is a can stabilizing pan 246. Pan 246 includes a bottom portion 247 having a peripheral upturned flange portion 248. As shown in FIG. 14, the stabilizing pan bottom 247 includes a pair of laterally spaced parallel arranged fore and aft reinforcing elements 249, 250. The stabilizing pan bottom 247 also includes a pair of spaced parallel arranged laterally extended reinforcing elements 251, 252. The fore and aft reinforcing elements and lateral reinforcing elements intersect each other to provide four juncture points. Connected to the stabilizing pan 246 at each of the reinforcing element juncture points are four vertically extending post elements 253, 254, 255, 256. The posts 253–256 are detailed to extend through complementary openings 257, 258, 259, and 260 formed in the magnetic pick-up head 240. The extended end of each of the posts 253–256 are connected to the under side of sub-frame support members 222, 223, to hold the stabilizing pan 246 in a fixed spaced relationship relative to the sub-frame 221, as shown in FIG. 11.

The extent of movement of the magnetic head relative to the stabilizing pan is sufficient to separate a layer of cans from the magnetic field developed by the magnetic head to allow the cans to be deposited onto the receiving conveyor 400 and allow the cans to be held by the pan to stabilize the layer on the loaded pallet just prior to being placed in the magnetic field.

Referring now particularly to FIGS. 9 and 12, the slip-sheet transfer mechanism 280 includes a vacuum pick-up head 281. The vacuum pick-up head is supported beneath the carriage 200 by an inverted substantially U-shaped frame support member 283. The frame support member 283 is connected to the underside of runner 201. The pick-up head 281 is provided with a vertically moveable support plate 285. Plate 285 carries a pair of suction cups 286. The support plate 285 is supported and guided for vertical translating movement by a pair of guide rods 287, 288, which are detailed to extend through a pair of sleeve elements 289, 290, mounted between the runner 201 and the inverted U-shaped support members 283. Vertical translating movement of the support plate 285 with suction cups 286 is effected by means of a power control cylinder 291, which is supported by the runner 201 and the inverted U-shaped support member 283, as shown in FIG. 12. The cylinder 291 includes a connceting rod 293 which has its extended end connected to the suction head support plate 285. Control means for effecting operation of the cylinders 291 will be described hereinbelow.

Referring now, again, to FIG. 14, the magnetic pick-up head 240 includes a pair of fore and aft extending notches 261, 262, complementary to the fore and aft reinforcing elements 249, 250 of the stabilizing pan and a pair of laterally extending notches 263, 264, complimentary to the laterally extending reinforcing elements 251, 252.

From the above described can transfer mechanism, it is apparent that the can transfer mechanism includes a sub-frame 221 mounted on the carriage 200 for vertical translating movement by four power control cylinders 226–229 and that the sub-frame 221 includes a magnetic pick-up head 240 which is vertically moveable relative to the sub-frame by means of power control cylinder 241. The above described relationship between the subframe 221 and the magnetic pick-up head 240 provides for vertical translating movement of the magnetic pick-up head realtive to a stabilizing pan 246 which is supported beneath the sub-frame 221 by means of the four vertically extending posts 253–256. Operation of the cylinder 241 is detailed to effect a movement of the magnetic pick-up head from an extended position adjacent the surface of the stabilizing pan to a retracted position displaced from the surface of the stabilizing pan. The four posts 253–256 will provide a guide means for the magnetic pick-up head relative to the stabilizing pan and the notches 261–264 of the magnetic pick-up head will allow the magnetic pick-up head to move to an extended position in full engagement with the bottom of the stabilizing pan bottom 247.

The magnetic pick-up head 240 is detailed in magnetic strength to develop a magnetic field sufficient to pick up a layer of cans contained on a loaded pallet.

As shown in FIG. 9, a slip-sheet storage bin 294 is provided on the support framework 7,8, etc. over the pallet magazine 600 and on the left end of the carriage support rails 298, 299. The support bin includes a plurality of parallel arranged and horizontally disposed slip-sheet support runners 295 which are supported in vertically spaced relationship below the rails 298, 299. Each of the support runners 295 include an upstanding slip-sheet alignment bracket 297 fixed to their opposite ends for providing aligned guide means for maintaining the slip-sheets in a vertically stacked relationship.

Control for the transfer assembly is provided by a series of conventional photoelectric cells and a series of conventional limit switches. The extent of travel of the carriage 200 along the guide rails 298, 299 is controlled as to leftward movement (FIG. 9) by a limit switch LS–9 located above the left end of guide rails 298 and controlled as to rightward movement by a limit switch LS–10 located adjacent the right end of guide rail 299. Each of the limit switches LS–9, LS–10, includes a conventional control arm detailed to be located in the path of the carriage movement. A limit switch LS–1 is also located adjacent the right end of guide rail 299 (FIG. 9) for sensing movement of the carriage 200.

A photo cell PE–6 is located adjacent the slip-sheet storage bin (FIG. 1) for sensing the movement of a slip-sheet from the pallet to the storage bin.

Located on the carriage 200 is a photo cell PE–4 which is detailed in location as shown in FIG. 13 to scan the area in which a layer of cans was removed to sense a can being displaced from the magnetic pick-up head.

A limit switch LS–8 is located on the vacuum pick-up head 281 for sensing the upward limit of movement of the moveable plate 285 with suction cups 286.

As shown in FIGS. 9 and 11, a limit switch LS–5 is supported on carriage runner 204 and includes a control arm for sensing the up limit position of the stabilizing pan and sub-frame support 221.

The electrical sequence of operation of the above described control elements and their relationship to the other palletizer controls will be described below in the description of the operation of the palletizer.

LOADED PALLET ELEVATOR

The loaded pallet elevator 300 is located on the depalletizer framework between the receiving conveyor 400 and pallet magazine 600 and beneath the path of travel of the layer can and slip-sheet transfer carriage 200. The function of the loaded pallet elevator is to receive a pallet containing a series of layers of cans from the loaded pallet infeed conveyor 100, elevate the loaded pallet in stepped increments of upward movement a sufficient amount to successively present each layer of cans on the loaded pallet to a proper aligned position with the magnetic transfer head, to allow the layers of cans to be transferred to the receiving conveyor 400.

Figure 4:
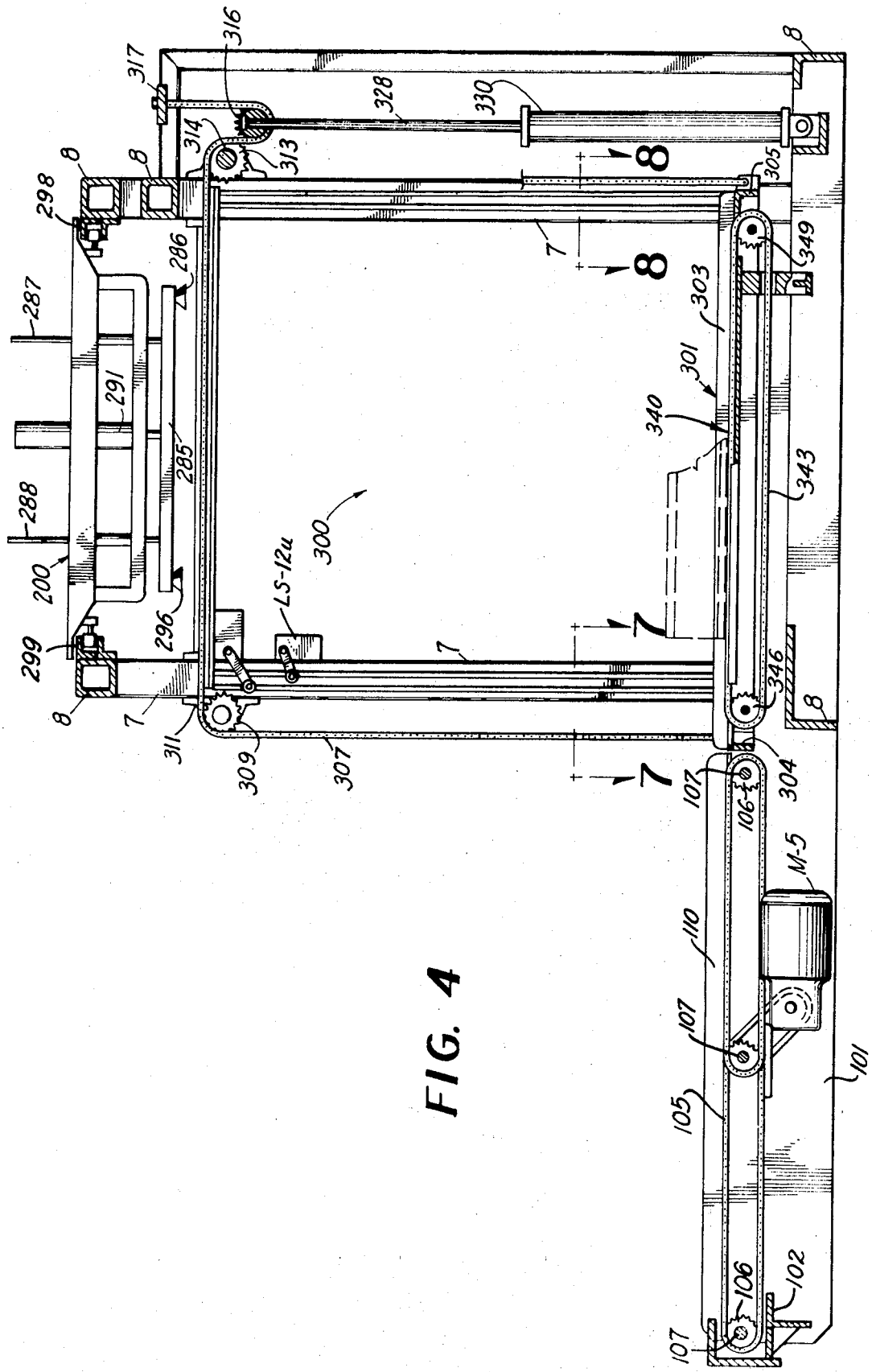
FIG. 4 is a vertical sectional view as would be seen along lines 4—4 of FIG. 3.
Figure 5:
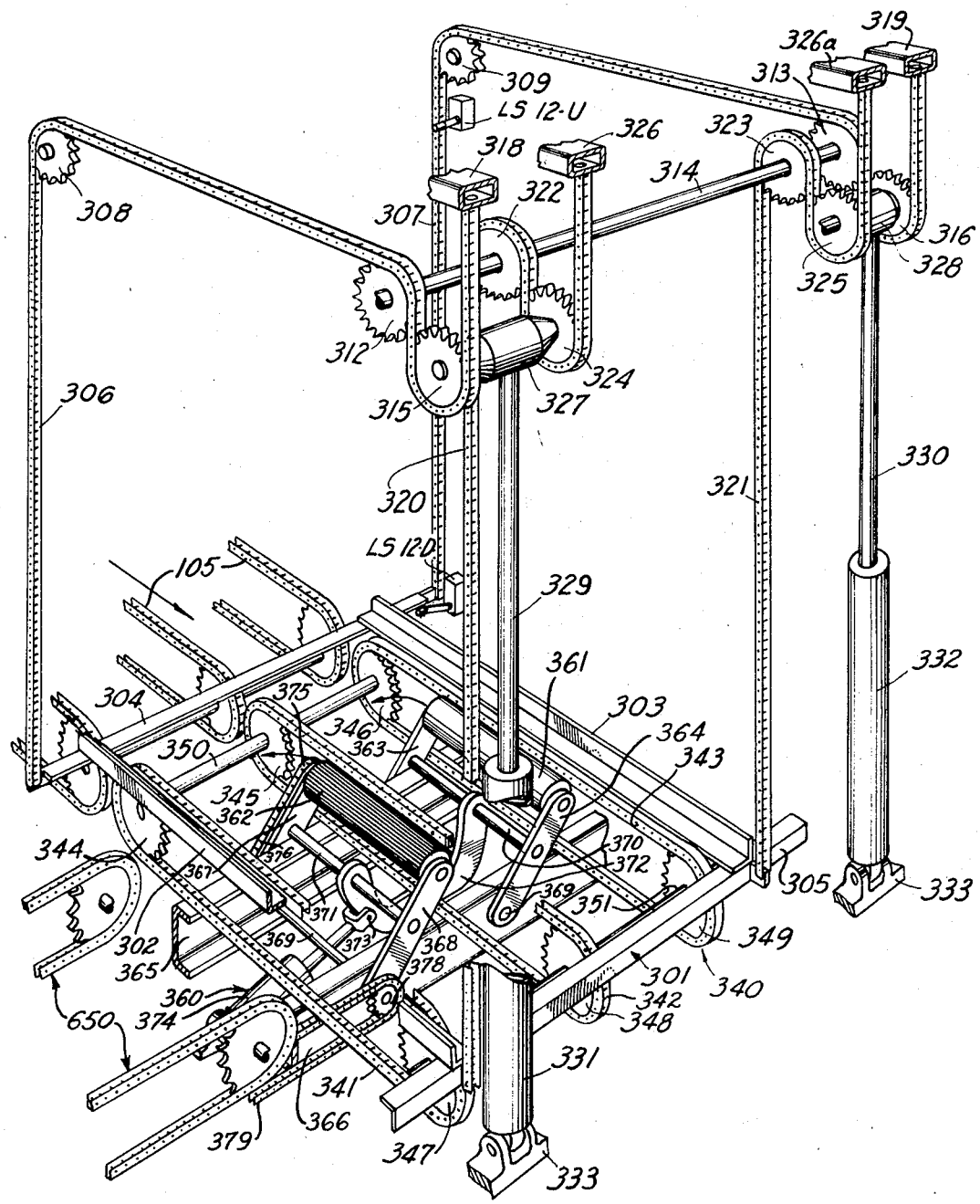
FIG. 5 is an enlarged fragmentary perspective view of the loaded pallet elevator, with certain parts omitted for purposes of clarity.
Figure 6:
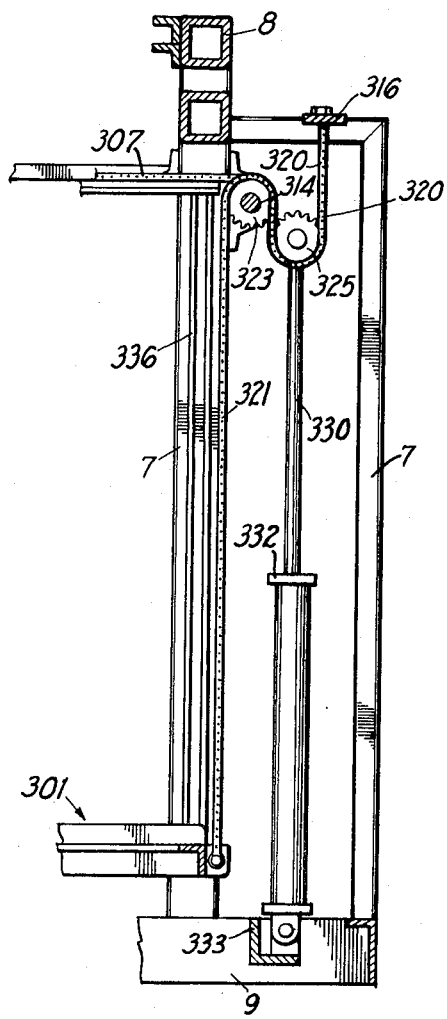
FIG. 6 is a fragmentary vertical section view showing the pallet elevator control means, with certain parts omitted for purposes of clarity.

Referring now particularly to FIGS. 1 and 4 – 8, the loaded elevator 300 includes a pallet support rack 301. The pallet support rack includes a pair of angle bars 302, 303 which are supported in parallel spaced relationship by a pair of cross support bars 304, 305. Each of the cross support bars 304, 305 includes two oppositely directed extended end portions. Connected to the extended end portions of cross support bar 304 are a pair of flexible lift chains 306, 307. The chains 306, 307 extend vertically upward and pass over a pair of idler support sprockets 308, 309 respectively. The support sprocket 308 is supported by a support block 310 as shown in FIG. 1 and the idler support sprocket 309 is supported by a support block 311. After the flexible elevator chains 306, 307 pass over the sprockets 308, 309 they extend in a horizontal direction to the right as shown in FIG. 5 and pass over a pair of idler sprockets 312, 313 supported by shaft 314. As the elevator lift chains 306, 307 leave the sprockets 312, 313 they extend down under and around a pair of movable sprockets 315, 316. After the elevator lift chains 306, 307 pass under the sprockets 315, 316 they extend vertically upward with their extended end being connected to a spaced pair of connecting brackets 318, 319 which are fixed to a cross frame member 317 of the palletizer frame.

A pair of flexible elevator chain elements 320, 321 are connected to the cross support bar 305 at a position adjacent the connection between the cross support bar 305 and the pallet retaining bars 302, 303. The elevator lift chains 320, 321 extend vertically upward and pass over a pair of sprockets 322, 323 which are rotatably supported by the shaft 314. As the elevator lift chains 320, 321 leave the sprockets 322, 323 they extend down and around a pair of sprockets 324, 325. After the elevator lift chains 320, 321 extend around the sprocket 324, 325 the extended end thereof extends vertically upward and is connected to a pair of brackets 326, 326a which are fixed to the palletizer cross frame member 317.

The sprockets 315, 316, 324 and 325 are rotatably supported by a pair of support heads 327, 328. The heads 327, 328 are fixed to the extended end of a pair of piston rods 329, 330. The piston rods 329, 330 are operatively supported for vertical translating movement by a pair of hydraulic power controlled cylinders 331, 332. Cylinders 331, 332 are fixed adjacent their lower end to a palletizer cross frame member 333. Cylinders 331, 332 are provided with conventional hydraulic control means for controlling the piston rods 329, 330 in a vertical translating movement within the cylinders. It is apparent that the above described pallet rack and elevator chain support mechanism is capable of supporting a pallet on the pallet support rack 301 and through operation of the power control cylinders 331, 332 the pallet support rack 301 may be elevated vertically upward to any one of a selected position between a lower pallet supported position and an upper pallet supporting position. When a pallet is supported in the lower support position the pallet is in a position for allowing the top layer of cans to be transferred therefrom to the receiving conveyor 400. The pallet elevator mechanism is then operated to effect successive stepped upward movement of the pallet to present the next layer of cans in alignment for pick-up by the magnetic pick-up head 240 for transfer to the receiving conveyor 400.

The operation of the hydraulic cylinders 331, 332 includes a conventional pressurized hydraulic power source (not Shown) controlled by conventional valve means (not shown). The operation of the hydraulic valves for effecting controlled movement of the pallet elevator chains 306, 307, etc., includes an upper limit switch LS–12U and a lower limit switch LS–12D. Each of the limit switches LS–12U and LS–12D includes a conventional control arm detailed in location for sensing the upper and lower limits of movement of the pallet racks support bar 304 (FIG. 5) to stop movement of the pallet elevator in its upper and lower limit positions, respectively. The progressive stepped raising of the pallet elevator in increments of movement is effected by a conventional photoelectric cell (not shown) which senses the upper edge of cans stacked on the pallet. When the photo-electric cell light is made by a layer of cans being removed from the pallet, the hydraulic cylinders 331, 332 will be actuated to raise the pallet and cans until the light is again blocked out, at which position the elevator is stopped in a position of alignment for transferring the next slip-sheet and layer of cans.

Referring now particularly to FIG. 4 and 5 the pallet conveyor for controlling a pallet within the pallet loading section includes a conveyor system 340. Conveyor system 340 includes three endless chain mechanisms 341, 342, 343. The endless chains 341, 342, and 343 are supported for operation by a series of sprockets 344, 345, 346, 347, 348 and 349. Sprockets 334–346 are fixed to a shaft 350 which is supported for rotation within the palletizer framework by conventional means, (not shown). Sprockets 347–349 are fixed to a shaft 351 which is also supported in the palletizer framework by conventional means not shown. Shaft 350 includes an extended end which is connected with a gearbox operatively associated with a conventional power motor means (not shown) for effecting operation of the endless conveyors. Operation of the conveyor drive motor is effected by a closing of the elevator lower limit switch LS–12D above described.

As shown in FIG. 4 the pallet support rack cross support bar 304, 305, and the horizontal flanges of bars 302, 303 are detailed in a lower limit position to be slightly lower than the upper run of the endless conveyor 341–343 whereby a pallet in this position will rest on the upper run of the endless conveyors 341–343 in such a manner that rotation of the conveyors 341–343 in a clockwise direction as shown in FIG. 4 will effect a transfer of a loaded pallet from the loaded pallet infeed conveyor 100 into the pallet elevator 300. While in this position, the endless conveyors 341–343 will also be in a position to transfer an empty pallet from the elevator to the pallet magazine conveyor.

Figure 7:
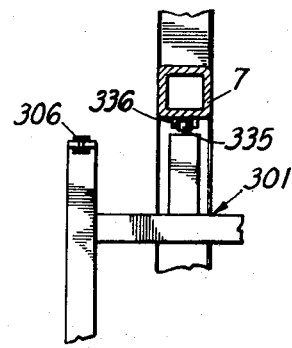
FIG. 7 is a fragmentary sectional view taken along lines 7—7 of FIG. 4, with certain parts being omitted for purposes of clarity.
Figure 8:
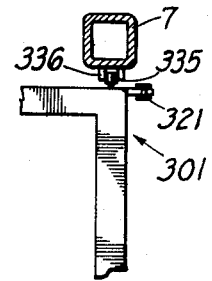
FIG. 8 is a sectional view similar to FIG. 7 taken along the lines 8—8 of FIG. 4.

As shown in FIG. 7 and 8, the pallet elevator is provided with a roller guide means adjacent each corner of the pallet rack 301. Each of the roller guide means includes a roller 335 guided by a vertically oriented channel-shaped track 336 which is mounted on a palletizer framework post 7.

As shown in FIG. 5, the pallet elevator 300 includes a pallet transfer mechanism 360 for transferring an empty pallet from the pallet elevator to the pallet magazine conveyor 650.

The pallet transfer mechanism 360 includes a pair of rollers 361, 362. Roller 361 is rotatably supported at the extended end of a pair of links 363, 364 which are pivotally mounted adjacent their other end by a pair of framework support members 365, 366. Roller 362 is rotatably is rotatably supported at the extend end of a pair of links 367, 368 which are pivotally mounted on a shaft 369 journaled for rotation in framework members 365, 366. Connected between links 363, 364 is a cross connecting rod 370 and connected between links 367, 368 is a cross connecting rod 371. The cross connecting rods 370 and 371 are connected together by a link 372. Link 372 is connected at 373 to a power control cylinder 374.

The above described pallet transfer rollers 361, 362 are supported by links 363, 364, 367 and 368 for movement between an upper pallet transfer position in which the upper surface of the rollers are substantially coplanar with the upper run of the pallet magazine conveyors 650 and a lower inactive position in which the rollers are positioned below the elevator conveyors 340. Movement of the rollers 361, 362 between the upper and lower limit positions is controlled by power cylinder 374.

Roller 362 includes a sprocket 375 fixed to the roller support for rotation with roller 362. Sprockets 375 is connected by a chain 376 to a sprocket (not shown) which is fixed to shaft 369. The shaft 369 includes an extended end which has fixed thereto a sprocket 378. The sprocket 378 is connected by a drive chain 379 to the pallet magazine conveyor means 650 for operation therewith. Rotation of the roller 362 when in the upper transfer position by the chain and sprockets drive sprocket 379, will effect a transfer of a pallet supported by roller 361, 362 to the pallet magazine. The rollers 361, 362 are maintained in their lower inactive positions when not being used to transfer an empty pallet to the pallet magazine.

The sequence of operation of the above described controlled functions as they relate to the other mechanism of the combination depalletizer and palletizer will be described herein below in the operation.

DEPALLETIZED LAYER RECEIVING CONVEYOR

The function of the receiving conveyor 400 is to receive a layer of cans transferred thereto from the loaded pallet by the magnetic pick-up head 240. The receiving conveyor is detailed in dimensions for receiving a full layer of cans as they are arranged on the pallet in a transverse array. After the cans have been deposited on the receiving conveyor, they are conveyed to the right as shown in FIG. 15 and transferred to an unscrambling conveyor mechanism 500.

Figure 15:
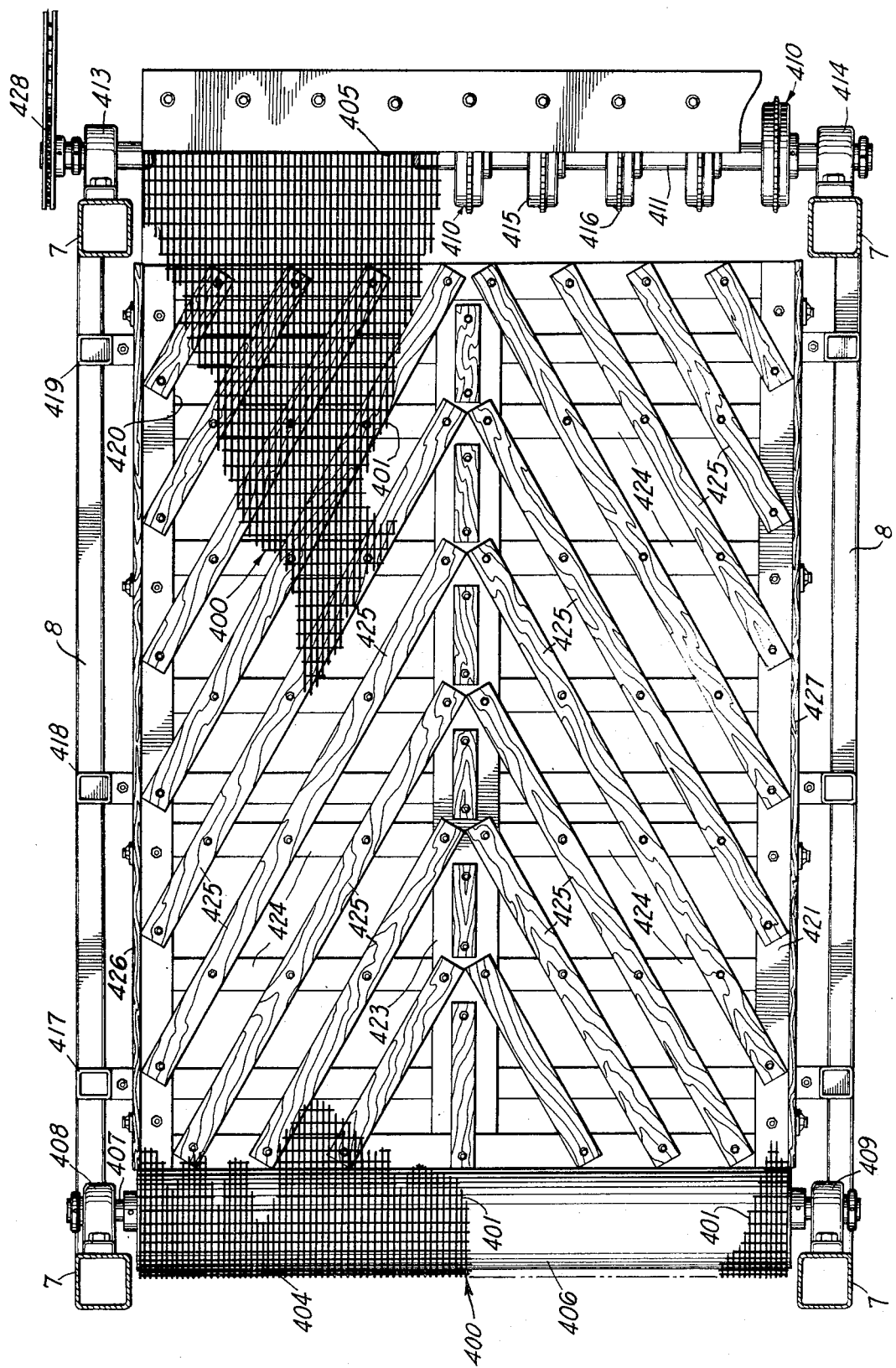
FIG. 15 is an enlarged top-plan view of the receiving conveyor, with certain parts omitted for purposes of clarity.

Referring now to particular FIG. 15, the receiving conveyor includes a conventional matrix or grid type conveyor 401 consisting of a plurality of longitudinally and transversely connecting elements. The receiving conveyor is supported on the depalletizer in such a manner as to define an upper run 402, a lower run 403, and in-feed end 404 and an outfeed end 405. The conveyor is supported adjacent the infeed end 404 by means of an elongated cylindrical roller 406. The roller 406 is fixed to a shaft 407. Shaft 407 is journaled in a pair of bearing blocks 408, 409. The bearing blocks 408, 409 are fixed to two of the vertically extending posts 7 of the palletizer framework. The receiving conveyor 400 is supported adjacent the outfeed end 405 by mans of a series of sprockets 410. The sprockets 410 are fixed to a shaft 411 in laterally spaced relationship as shown in FIG. 15. Shaft 411 is supported by a pair of bearing blocks 413, 414 which are mounted on vertically extending post 7 of the depalletizer framework.

Each of the sprockets 410 includes a smooth cylindrical drum like surface 415 which is detailed in design to contact and support the matrix type conveyor 401. Each of the sprockets 410 also includes a series of radially projecting teeth portions 416 detailed in design to engage the conveyor 401 between the longitudinally and transverse connecting elements.

The upper run 402 of the receiving conveyor is supported by three horizontally oriented runners 417, 418 and 419 which are fixed to the horizontally extending framework members 8 in spaced relationship as shown in FIG. 15. Fixed to the top of the runners 417, 418, 419 are beneath the upper run of the receiving conveyor 400 are two longitudinally extending support members 420, 411. The support members 420, 421 are fixed to the runners 417–419 adjacent the lateral edges of the conveyor 401. Located on the runners 417–419 intermediate the two longitudinally extended members 420, 421 is a intermediate longitudinal support member 423. A series of cross connecting members 424 is fixed to the longitudinally extending members 420, 421, 423 in longitudinally spaced relationship as shown in FIG. 15. Supported on top of the longitudinal extended members 420, 423 and beneath the upper run 402 of the receiving conveyor is a series of angular disposed oil impregnated runners 425. The runners 425 are detailed in support relationship to provide a upper surface on which the upper run 402 of the receiving conveyor can slide. Supported on the two outside longitudinally extending members 420, 421 are a pair of can guide means 426, 427. The purpose of the canned guide means 426, 427 is to prevent cans from being displaced laterally off the edges of the conveyor 440 as they are moved to the unscrambling conveyor 500. The receiving conveyor 400 is driven in a clockwise direction (or to the right as shown in FIG. 15) such that cans deposited thereon will be carried over the outfeed end 405 and onto the unscrambling conveyor 500. Drive for the conveyor is provided by a conventional electric motor M–5 through a chain and sprocket mechanism 428.

UNSCRAMBLING CONVEYOR

The function of the unscrambling conveyor mechanism 500 is to receive cans transferred thereto from the receiving conveyor 400 in a transverse array, whereby a number of cans are transferred simultaneously to the unscrambling conveyor mechanism. The unscrambling conveyor mechanism includes a main outfeed conveyor detailed in design and constructed to convey a single row of cans away from the unscrambling conveyor mechanism to a can processing means.

The unscrambling conveyor mechanism is supported on the main body portion 2 of the support framework and the first laterally projected framework portion 3, as shown in FIG. 1 and 2. The unscrambling conveyor 500 is supported on the support framework by means of a pair of support members 501, 502, which extend parallel to the longitudinal direction of the conveyor 500. The members 501, 502, are connected to support framework portions 8 in spaced relationship as shown in FIGS. 16A and 16B. Mounted between the runners 501, 502, is a series of cross connecting members 503. Each of the cross connecting members 503 includes two vertically extending portions 504, and a horizontally connecting support portion 506 (FIG. 2).

The unscrambling conveyor mechanism 500 includes a main outfeed conveyor 507. The conveyor 507 is separated from the outfeed end 405 of the receiving conveyor 400 by means of three transfer conveyors 508, 509, and 510. Supported on an opposite side of the main conveyor 507 from the transfer conveyors 508–510 are two over capacity conveyor means 511, 512. All of the conveyor mechanisms 507–512 are supported for conveying directions substantially at right angles to the conveying direction of the receiving conveyor 400. The conveyor mechanism 507–512 is detailed to include an upper run supported in substantially coplanar relationship with the upper run of the receiving conveyor 400.

Each of the conveyor mechanisms 507–512 includes a series of plates 513 which are pivotally interconnected by conventional male and female connectors. Depending beneath the under side of each of the plates 513 is a downwardly projecting lug (not shown). The purpose of the lug is to allow the conveyors to be guided in a predetermined direction and from preventing the conveyors from being displaced from the support sprockets. All of the conveyors 507–512 are supported adjacent one end (the right end as shown in FIG. 16B) by means of a shaft 516. The shaft 516 is journaled for rotation in a pair of bearing members 517 which are connected to framework plates 518. Supported on the shaft 516 is a series of idler sprockets 519 and a pair of driving sprockets 520. The idler sprockets 519 are freely rotatable relative to the shaft 516 and the driving sprockets 520 are fixed to the shaft 516 for rotation therewith, the purpose of which will be described hereinbelow.

As shown in FIG. 16, the first transfer conveyor 508 is supported on an opposite end from shaft 516 by a driving sprocket 521. The sprocket 521 is fixed to a support shaft 522 which is journaled for rotation in a series of bearing support members 523. The bearings 523 are fixed to a series of support plates 524 which are connected to the support framework between spaced cross connecting members 503. The shaft 522 includes an extended end as shown in FIG. 16A, which has mounted thereon a pair of sprockets 525, 526.

The second transfer conveyor 509 is supported on an opposite end from shaft 516 by a driving sprocket 527 which is fixed to a shaft 528. The shaft 528 is journaled for rotation in a series of bearing blocks 529. The bearings 529 are mounted on a series of spaced support plates 530 which are connected between spaced cross connecting members 503. The shaft 528 also includes an extended end which has mounted thereon a pair of driving sprockets 531, 532.

The third transfer conveyor 510 is supported on an opposite end from shaft 516 in substantially the same manner as the first two transfer conveyors 508, 509, and the support includes a driving sprocket 533 which is fixed to a support shaft 534. The support shaft 534 is journaled for rotation in a series of bearings 535. The bearings 535 are mounted on connecting plates 536 which are supported between spaced cross connecting members 503. The extended end of the shaft 534 has mounted thereon a pair of driving sprockets 537, 538.

The main outfeed conveyor 507 is supported adjacent the outfeed end (or the left end as shown in FIG. 16A) by means of a driving sprocket 539 which is mounted on a support shaft 540. The support shaft 540 is journaled for rotation in a pair of bearing blocks 541 which are mounted on support plates 542. The support plates 542 are fixed to cross connecting members 503. The lower extended end of the shaft 540 includes a driving sprocket 543. Also mounted on the support shaft 540 is a pair of idler sprockets 544 which are provided for supporting the left end of the over capacity conveyors 511, 512.

As shown in FIGS. 16A and 16B, each of the conveyor driving sprockets includes a pair of axially spaced discs 545, 546, which are supported relative to each other to define a groove 547 there between. The purpose of the groove is to provide a guide track for the depending lug of the conveyor 513 to prevent the conveyors from being laterally displaced from the driving sprockets. Each of the driving sprockets disc members 545, 546, includes a series of radially extending tooth portions (not shown) detailed for engagement with the conveyor plates to provide a driving engagement with its associated conveyor. Each of the idler sprockets 519, 544, also includes a pair of axially spaced discs 548, 549, detailed and supported relative to each other to provide a grooved guiding portion 550. The rotational plane of a conveyor driving sprocket and a conveyor idler sprocket are supported such that they are coplanar relative to each other. The upper run of each of the conveyors 507–512 is supported and guided by a series of wear strips 551.

Drive to the transfer conveyors 508–509, and the main outfeed conveyor 507, is provided by means of a motor M–4 which is connected by a chain 552 to the driving sprocket 526. The driving sprockets 525 and 531 are supported in coplanar alignment for receiving a driving chain 553 for effecting a drive of the second transfer conveyor 508, from the motor M–4. The sprockets 532 and 538 are also supported in coplanar alignment for receiving a driving chain 554. The sprockets 537 and 543 are supported in coplanar alignment for receiving a drive chain 555. Thus it is apparent that by providing a drive from the motor M-4 through chain 552 to the sprocket 526, the conveyors 507, 508, 509, and 510, will all be driven such that the upper run of the conveyors will move to the left as shown in FIGS. 16A and 16B. The two over capacity conveyors 511, 512, are driven through sprockets 520 which are fixed to the shaft 516. The shaft 516 includes an extended end which has mounted thereon a sprocket 560. Sprocket 560 is driven by a chain 561 from motor M-5. The direction of drive to the over capacity conveyors 511, 512, is detailed such that they will move in an opposite direction from the conveyors 507-510.

Supported above the unscrambling mechanism 500 is a number of can guide members 556 (FIGS. 2 and 9) detailed to extend from adjacent the left end of the outfeed portion of the receiving conveyor 400 to the upper lateral edge of the main outfeed conveyor 507. The purpose of the can guide 556 is to allow cans moved there against by the transfer conveyors 508-510 to slide laterally there along until the cans have reached the main outfeed conveyor 507 thereafter which the cans will move with the main outfeed conveyor 507 to remote can processing means, such as can labeling means. The width of the main outfeed conveyor and can guide means associated therewith is detailed such that the outfeed conveyor 507 will only convey a single row of cans there along.

In the process of transferring cans from the receiving conveyor to the main outfeed conveyor 507, the excessive amount of cans which are not allowed to move with the main outfeed conveyor 507, will be moved thereacross onto the over capacity conveyors 511, 512. Since the over capacity conveyors 511, 512, are driven in an opposite direction, they will move to the right as shown in FIG. 16 away from the can outfeed end, which allows cans to move away from the unscrambling conveyor mechanism by the main outfeed conveyor 507. Supported above the unscrambling conveyor mechanism is a second angled can guide means 557 which is detailed to extend angularly across right end of the over capacity conveyors 511-512 as shown in FIG. 9, whereby any cans moving there along will be guided laterally, onto the main outfeed conveyor 507 or onto one of the transfer conveyors 508-510 such that the cans will again be moved to the left for movement with the main outfeed conveyor 507 away from the depalletizer to remote can processing means as described above. An upstanding can guided border 558 is provided along the lateral edge of the over capacity conveyors on an opposite side from the receiving conveyor. The can guide 558 extends around the end of the conveyors 507-512 to prevent any cans from being displaced over the right hand edge of the conveyor. A transfer plate 559 is supported by conventional means (not shown) between the receiving conveyor 400 and the unscrambling conveyor mechanism 500 in substantially coplanar relationship therewith as shown in FIG. 5.

The sequence of operation of the unscrambling conveyor as it relates to the other portions of the depalletizer will be described below in the operation.

PALLET MAGAZINE

The function of the pallet magazine 600 is to receive an empty pallet from the depalletizer and to transfer the empty pallet to the case palletizer as required, and to contain a stack or series of pallets in storage to be dispensed individually to the case palletizer when an empty pallet is not available from the depalletizer. The pallet magazine 600 is located between and immediately adjacent the depalletizer elevator and the case palletizer and beneath the slip-sheet storage bin. The pallet magazine is supported by four of the vertically extending posts 7 and a series of the horizontal support members 8, 9, of the support framework.

Figure 17:
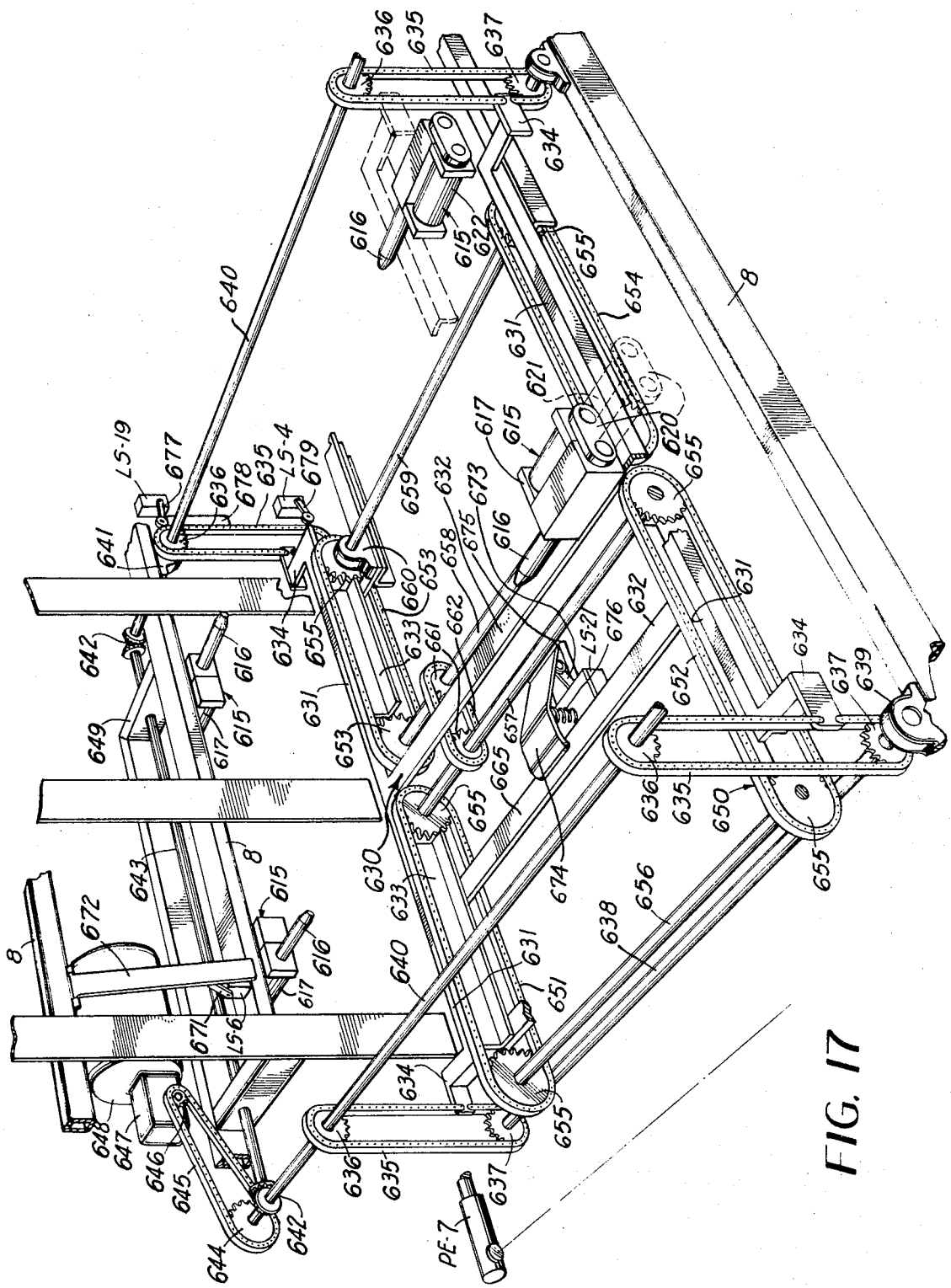
FIG. 17 is an enlarged fragmentary perspective view of the pallet magazine with certain parts omitted for purposes of clarity.

Referring now particularly to FIG. 17, the pallet magazine 600 includes four pallet retaining lugs means 615. The pallet retaining lug means 615 are supported beneath longitudinally extending beams 8. Each of the pallet retaining lugs includes a pallet retaining pin 616 supported for horizontal reciprocating movement in a support block 617. Each of the pins 616 includes a first extended end 618 (FIG. 19) which is supported in coplanar relationship and detailed for engaging and holding a pallet in a retaining position (FIG. 18) and an opposite power controlled end 619. The retaining pin end 619 is connected by a short link 620 to a piston rod 621 (FIG. 18). The piston rod 621 is operatively supported by power control cylinder 622. The cylinder 622 is supported adjacent the support block 617 by a pair of extending brackets 623, 624. The retaining pins 616 are controlled by the power control cylinder for effecting a movement of the pins from a pallet retaining position, as shown in FIG. 18, to a pallet releasing position as shown in FIG. 19. The sequence operation of the retaining pins will be described hereinbelow.

As shown in FIG. 17, the pallet magazine 600 includes a pallet receiving rack 630 operatively supported beneath the pallet retaining lug means 615 for effecting movement of a pallet from the pallet magazine to a pallet conveyor. The pallet receiving rack 630 includes a pair of horizontally oriented and laterally spaced parallel pallet retaining bars 631. The pallet retaining bars 631 are connected together in spaced relationship by a cross connecting member 632 located intermediate the ends of bars 631. A series of L-shaped brackets 634 are connected to the pallet receiving rack adjacent the four corners thereof. Each of the L-shaped brackets 634 is connected to an endless chain 635. The chains 635 are supported in a vertically extending position by upper and lower support sprockets 636, 637, respectively. The lower support sprockets 637 are fixed to a cross connected shaft 638. The shaft 638 is mounted in conventional bearing block means 639. The upper support sprockets 536 are mounted on an upper cross support shaft 640. The shafts 640 are also supported by conventional bearing block means 641, only one of which is shown in FIG. 17. The left end of shafts 640 as shown in FIG. 17 include an extended end portion. The extended end portions of shafts 640 are drivingly connected together by a bevel gear means 642 and a connecting shaft 643. Connected to the extended end of one of the shafts 640 is a sprocket 644. Sprocket 644 is drivingly connected by a chain 645 to a second sprocket 646. The sprocket 646 is supported for rotation by a conventional gear box means 647 which is drivingly connected to a conventional power motor means 648. The motor drive means 647, 648, and the connecting shaft 643 are supported by a laterally extended framework means 649.

As shown in FIGS. 10 and 17, the pallet magazine 600 includes a pallet conveyor system 650. The conveyor system 650 includes four endless chain conveyors 651, 652, 653, and 654. The endless chains 651, 652 are arranged in laterally spaced and aligned pair on the left side of the pallet support rack cross connecting bar 632, as shown in FIG. 17, and the endless chains 653, 654, are arranged in a laterally spaced and aligned pair on the right side of bar 632.

The endless chains 651–654 are supported by a series of sprockets 655. The sprockets 655 are fixed to four shafts 656, 657, 658, and 659, which are mounted for rotation in a substantially horizontal plane by conventional bearing blocks 660. Shaft 657 and 658 include aligned fixed sprockets 661. A chain 662 is supported on the sprockets 661 for drivingly connecting the conveyors 651, 652 to the conveyors 653, 654. Shaft 656 includes an extended end which is connected by conventional chain and sprocket means (not shown) to a motor M-5 for effecting operation on the magazine conveyors 650.

The conveyors 650 are driven in a counter-clockwise direction as shown in FIG. 10, such that a pallet supported thereby will be delivered to the case palletizer 700 and such that an empty pallet presented thereto from the depalletizer elevator will be conveyed into the pallet magazine section for temporary storage.

The pallet magazine includes a series of sensing control switches. A first control switch LS–6 is supported on a horizontally extended framework member 8. Switch LS–6 includes a control arm 671 which is in operative engagement with a vertically extending pivotal link 672. Pivotal movement of the link 672 will effect an actuation of the sensing switch LS–6. A second sensing switch LS–21 is supported on a cross brace member 665 of the conveyor means 650. Switch LS–21 includes a conventional control arm 673 which is in operative engagement with a pivoted link 674. Link 674 is pivotally connected at 675 to a second cross connected member (not shown). Link 674 is spring biased upwardly by a compression spring means 676. Also supported on the pallet magazine is a third pallet sensing switch LS–11 (FIG. 18) which includes a control arm for sensing a predetermined location of a pallet.

The pallet receiving rack 630 includes an upper limit control switch LS–19 and a lower limit control switch LS–4. The upper limit switch LS–19 includes a control arm 677 in operative engagement with a sensing member 678 which is fixed to one of the endless chains 635. The lower limit switch LS–4 also includes a control arm 679 which is supported for engagement by the sensing member 678 to sense a lower limit position of the receiving rack 630. The pallet conveyor 650 also includes a photocell control PE–7 for maintaining operation of the conveyor 650 for a predetermined period of time. The sequence of operation of the pallet magazine control including sensing switches LS–4, LS–6, LS–19, LS–21, and PE–7 will be described hereinbelow in the operation of the palletizer.

OPERATION

Before operation of the palletizer can begin, a series of pallets must be positioned within the pallet magazine. In order to position pallets in the pallet magazine, the first pallet must be put in place by hand. This is accomplished by placing an empty pallet in position over the rear pallet retaining pins 616. A conventional manual override switch shown in FIG. 20, must be then depressed to move the front pallet retaining pins 616 to a retracted position so that the pallet can be positioned in place for receiving the front retaining pins 616.

After the pallet has been positioned in proper alignment for receiving the pallet retaining pins on the front of the pallet magazine, the manual override switch is released to allow the retaining pins 616 to return to their extended position thereby engaging the pallet as shown in FIG. 18. Additional pallets can now be added to the first pallet, this being accomplished either by hand or by the use of a conventional fork-lift truck which will position a series of pallets within the pallet magazine simultaneously. As shown in FIG. 18, the second pallet from the bottom will actuate limit switch LS–6. This switch insures that one pallet will always remain in the pallet retaining pins 616 so that a stack of pallets can easily be inserted into the magazine.

Figure 20:
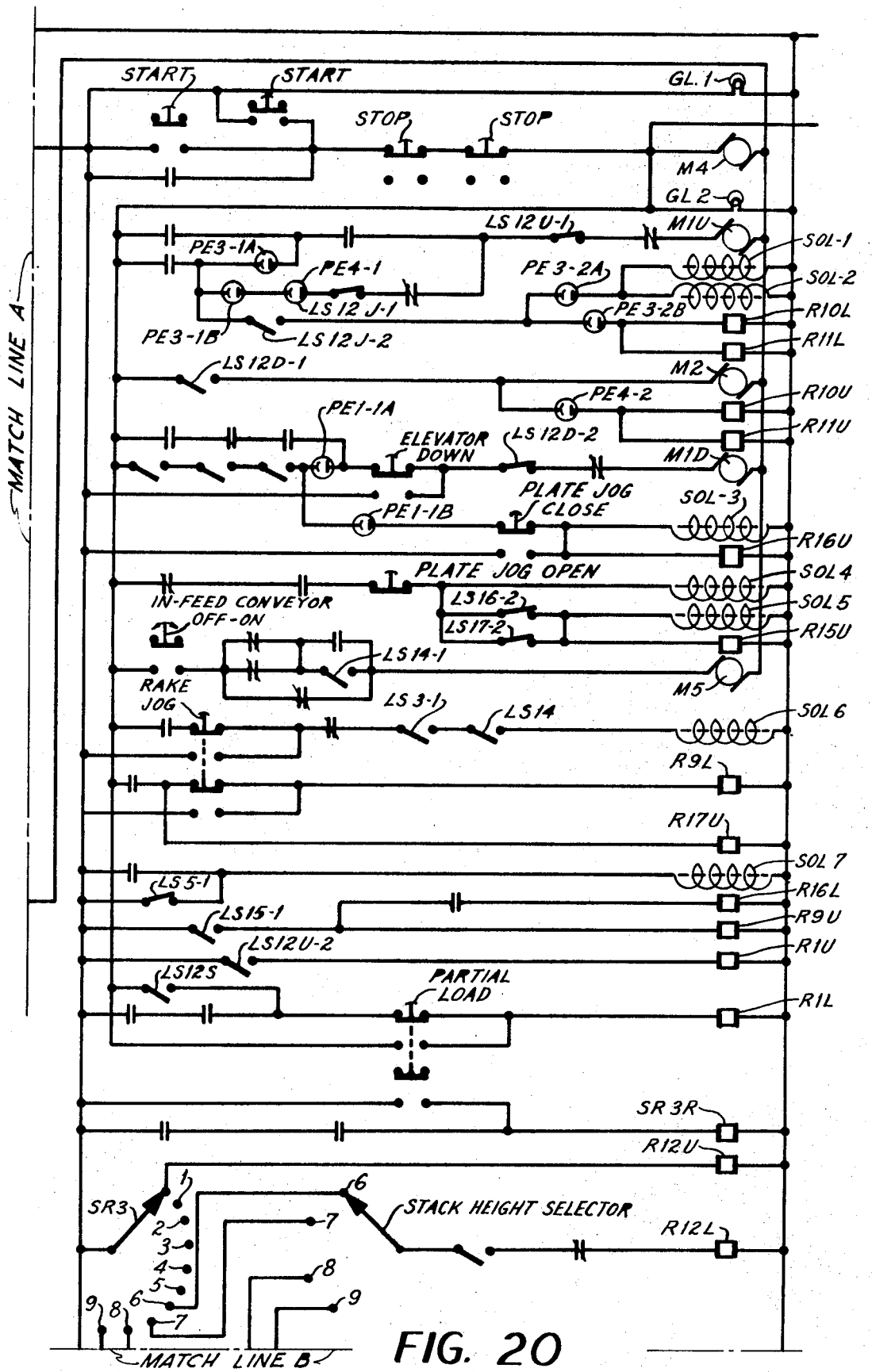
FIG. 20, 20A and 20B are electrical schematic diaghram of the control circuit.
Figure 20A:
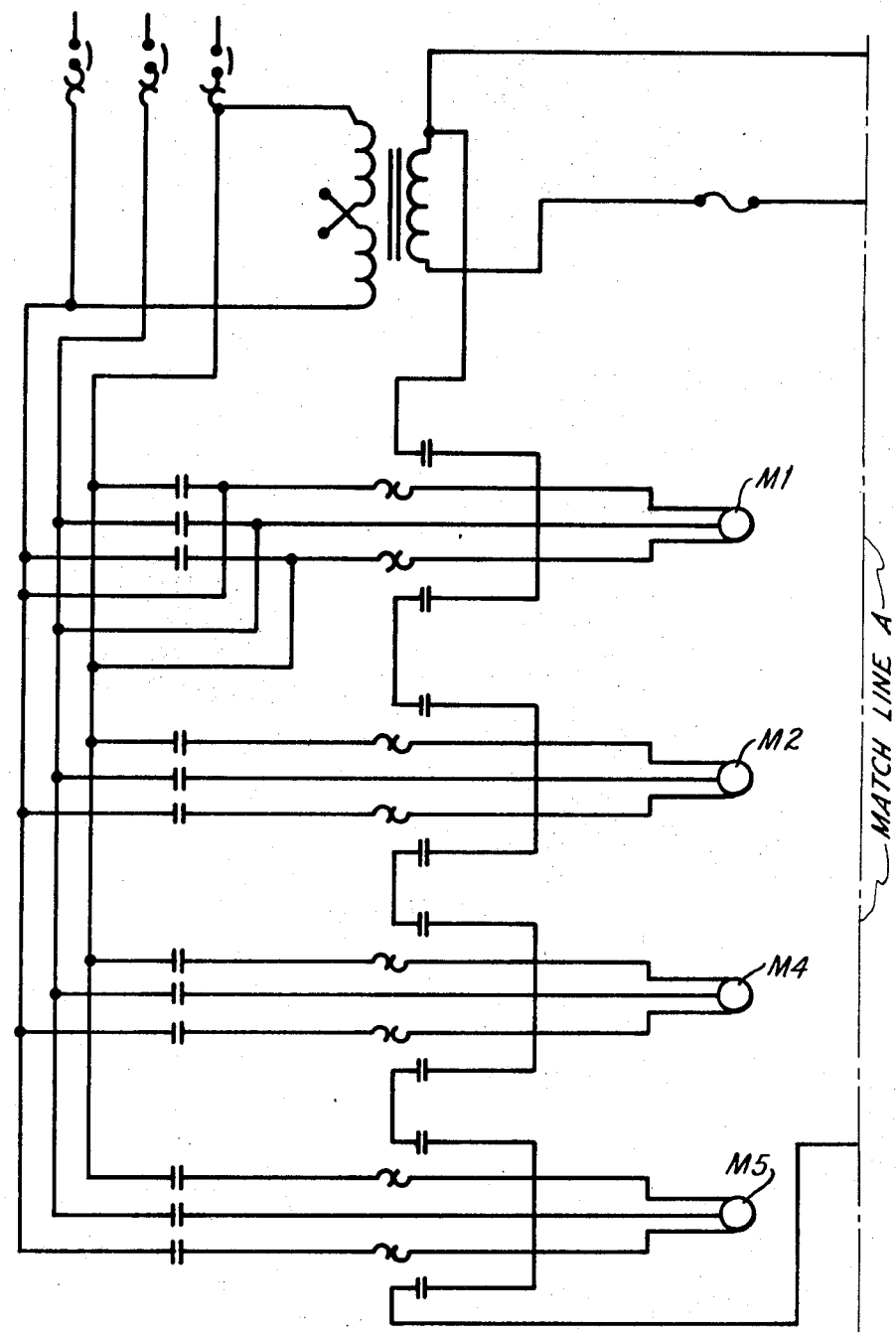
Figure 20B:
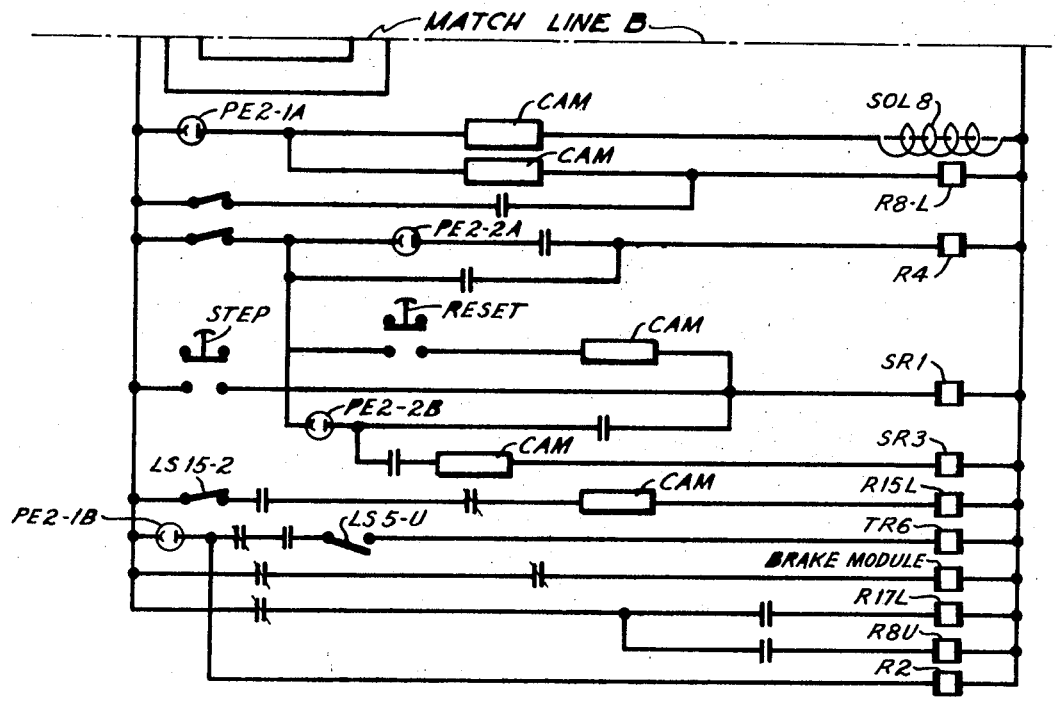

After a conventional start button, shown in the electrical diagram of FIG. 20, has been depressed to initiate an automatic operation of the combination depalletizer and palletizer, the pallets will be fed from the pallet magazine to the case palletizer in the following manner. When the start button is depressed, the pallet magazine receiving rack 630 which is controlled by the endless chain mechanism 635, will move upwardly until it actuates limit switch LS–19. The pallet receiving rack 630 is stopped in its upper limit position by actuating the upper limit switch LS–19 which will effect retraction of retaining pins 616 and reverse the direction of drive to the chain 635 to thereby allow the pallet receiving rack to move downwardly. As the pallet receiving rack moves downwardly, the stack of pallet contained in the pallet magazine will also therewith, downwardly therewith because the pallet retaining pins 616 have been moved to their retracted position by the making of the limit switch LS–19.

Movement of the pallet receiving rack 630 away from the limit switch LS–19 will allow the pallet retaining pins to be removed to their extended pallet retaining position. HOwever, the amount of descent of the pallet receiving rack is sufficient to allow the bottom pallet of the rack to be moved below the pallet retaining pins, whereby movement of the pallet retaining pins 616 to their extended positions will engage the second pallet contained in a stack of pallets. A continued downward movement of the pallet receiving rack 630 will cause the pallets carried thereby to actuate limit switch LS–21 which indicated that a pallet is in position on the pallet conveyor 650 and which will prevent the pallet magazine conveyor and pallet receiving rack from again attempting to retrieve another pallet. As described above, in the description of the pallet magazine, the limit of downward movement of the pallet receiving rack is detailed such that it is allowed to move a slight amount below the pallet conveyor 650 so that the pallet will now be supported on the pallet conveyor for movement away from the pallet magazine.

The downward limit of movement of the pallet receiving rack 630 will actuate limit switch LS–4 which will initiate operation of the infeed conveyor of the case palletizer to effect a movement of the magazine conveyor 650 and the pallet into the pallet loading section of the case palletizer.

A pallet will now be in position in the case palletizer and will move upwardly to a proper position for receiving layers of cases which are accumulated in a predetermined pattern and stacked on the pallet to form a series of layers of containers thereon. The details of construction of the case palletizer forms no part of the present invention and reference to made to applicants' copending application, Ser. No. 775,965, filed Nov. 14, 1968, now Pat. No. 351,736, issued July 28, 1970, for a stacking machine for the details of construction of the case palletizer.

Depression of the start switch to effect an automatic sequence of operation of the case palletizer will also initiate an operation of the can depalletizer to effect movement of a pallet containing a series of layers of cans supported on the infeed conveyor to the depalletizer elevator. When the start button is depressed the motors associated with the receiving conveyor 400 and the unscrambling conveyor 500 will also be started to initiate operation thereof. The loaded pallet infeed conveyor will move a loaded pallet of cans into the elevator section breaking the light beam of photoelectric cell PE–2 (FIG. 1). With the light beam of PE–2 broken and the light beam of PE–1 remade and the stepping switch, which is of conventional construction and shown in the electrical diagram of FIG. 20, will be stepped to position No. 1 whereby the elevator will travel up until the top layer of cans breaks the light in photoelectric cell PE–3. With the light beam of PE–3 broken, the stepping switch will move to position No. 2. With the stepper switch in position 02 the magnetic pick-up head and stabilizing pan will be energized. The pan 247 will travel down until it releases limit switch LS–3. With limit switch LS–3 released, the stepping switch will step to position No. 3. With the stepping switch in position No. 3 the controls for the magnetic pick-up head 240 will be energized. The magnetic pick-up head and the pan will then travel up until it makes limit switch LS–3 and with the photoelectric cell PE–5 realigned, limit switch LS–3 made, the LS–8 made, the stepper will step to position No. 4. With the stepper in position No. 4, and the magnetic pick-up head over the receiving conveyor, the head will be energized. With the receiving conveyor motor M–3 running, the light beam of photoelectric cell PE–4 made, the head will travel over the receiving conveyor. Should the head drop a can, the head would break the light beam in PE–4 which would stop the head travel and sound the alarm. The head continues traveling over the receiving conveyor until it contacts limit switch LS–10. With limit switch LS–10 made, the stepper will step to position No. 5. With the stepper in position No. 5 the control for the stabilizing pan 247 and the vacuum pick-up heads 285 will be energized. The pan will travel down until it releases limit switch LS–3. With limit switch LS–3 closed, the stepper will move to position No. 6. With the stepper in position No. 6, the magnetic pick-up head 240 down, the stabilizing pan 247 down, and the vacuum pick-up heads 285 down, the controls therefor will be de-energized. The pan will travel up until it makes limit switch LS–3. The vacuum heads will travel up until they make limit switch LS–8. With the photoelectric cell PE–6 light beam made, indicating that the slip sheet storage bin is not full, limit switch LS–3 made indicating the pan up, LS–8 made indicating the vacuum heads up, the stepper will step to position No. 7. With the stepper in position No. 7, indicating the magnetic pick-up head over the elevator, the controls therefor will be energized. The head travels over the elevator making LS–9. With LS–9 made and the light beam of PE–6 broken, indicating the slip sheet was removed from the elevator, the stepper will move to position No. 8. With the stepper in position No. 8, it will feed a pulse to the coil of the stepping switch which index the stepping switch to position No. 9.

With the stepper switch in position No. 9 and the light beam of photoelectric cell PE–3 made, the elevator will travel up until the light beam of PE–3 is broken by the next adjacent top layer of cans. With the light beam of PE–3 broken, the stepping switch will step to position No. 10.

The above sequence will be repeated with one exception and that is the stepping switch will operate or step from position No. 9 to position No. 1 as indicated herein, it requires one-half revolution of the stepper switch to depalletize one layer of cans.

With the elevator in a position for transferring the last layer of cans contained thereon, the limit switch LS–12S will be made. With the limit switch LS–12S made and the stepping switch in position No. 3 or No. 11, a relay R–2 will be will be latched. With the relay R–2 latched, the pallet elevator and the pallet magazine will stack the pallet that is present on the pallet infeed chains as indicated by LS–12 being made. With the limit switch LS–12S made and the stepping switch in position No. 7 or No. 15 which indicates the vacuum cups have removed the last slip-sheet from the pallet, a relay R–1 will be latched. With the relay R–1 latched, the elevator will travel down until it contacts limit switch LS–12D. With limit switch LS–12D made, relay R–3 will be energized to indicate the elevator with an unloading pallet has been moved to the lower limit position. With relay R–1 latched, relay R–3 energized, and relay PR–1 latched, relay R–5 will latch. With relay R–5 latched, relays R–1 and R–2 will unlatch. With relay R–5 latched, relay R–19 will be energized and the pallet cross feed will be energized. The pallet contained in the depalletizer elevator will transfer into the pallet magazine and move toward the loader section of the case palletizer until the pallet contacts limit switch LS–21 and the air operated pallet stops. With limit switch LS–21 made, relay R–5 will be unlatched de-energizing relay R–19. When relay R–19 is de-energized, the pallet lift will energize the pallet infeed conveyor. With the pallet infeed conveyor energized, the above sequence will be repeated for the next pallet load.

With a loaded pallet on the elevator infeed conveyor, it will continue to run until another loaded pallet has moved forward and broken the light beam of photoelectric cell PE–1. With the elevator up and PE–1 broken, the pallet infeed conveyor will stop. One additional load may be placed on the pallet infeed conveyor at this time.

It is to be understood that the above described pneumatic control cylinders and the hydraulic control cylinders are provided with conventional solenoid control valves (not shown) to be operated by the above described conventional limit switches and photoelectric cells in the manner stated. Reference is made to FIG. 20 which illustrates the complete electrical circuit diagram for operation of the component parts of the combination can depalletizer and palletizer in an automatic sequence of operation. It is to be understood that the above described stepper switch shown in FIG. 20 and the relays and time control means shown in FIG. 20 are of conventional structure which forms no part of the present invention.

Further, the can labeling means and the case packaging machine are shown in block diagram on FIG. 3 in the manner that that they relate to the can depalletizer and the case palletizer for performing an automatic sequence of operation of cans moving from the depalletizer to the labeling machine, to the case packaging machine, and with the cases thereafter moving to the case palletizer. Since the details of the labeling machine and the case packaging machine forms no part of the present invention, they are illustrated on the schematic diagram of FIG. 3 in block diagram. Further, since the details of construction of the case palletizer forms no part of the present invention, reference is made to applicants' above identified co-pending application for the details of construction. It is to be understood that the inventive concept of the present invention includes the location of the case palletizer in immediate vicinity of the can depalletizer whereby a pallet being unloaded from the can depalletizer can be transferred to a pallet magazine for storage or can be transferred directly to the case palletizer for use as required.

It now becomes obvious that the above described illustrative embodiment of the combination can depalletizer and case palletizer is capable of obtaining the above stated objects and advantages. It is apparent that those skilled in the art may make modifications in the details of construction without departing from the spirit of the invention which is to be limited only by the scope of the appended claims.

What is claimed is:

1. An article handling system for use in removing layers of stacked articles from a pallet comprising, in combination:

a. a pallet support elevator mounted on said system for supporting and elevating a loaded pallet containing a series of layers of articles with each layer separated by a slip sheet;
   b. conveyor means operatively supported on said article handling system adjacent said pallet support elevator and in position for receiving a layer of articles transferred thereto from the loaded pallet, said conveyor means including a first conveyor located on said article handling system for receiving a layer containing a series of depalletized articles arranged in a transverse array and for conveying said layer of articles along a first predetermined path, a second conveyor supported on said system for successively conveying each article of said series of articles along a second predetermined path, and a series of conveyors located between said first conveyor and said second conveyor, said second conveyor and said series of conveyors being parallel arranged in side by side relationship and angularly disposed across the width of said first conveyor, with the conveying surfaces of said first conveyor, said second conveyor and said series of conveyors being detailed in substantially the same plane whereby the articles can be successively transferred from one conveyor to an adjacent conveyor, and wherein angularly disposed article guide means is operatively associated with said series of conveyors for guiding successive articles from said series of conveyors onto said second conveyor;
   c. means supported on said article handling system adjacent said pallet elevator for receiving a slip sheet transferred thereto from said loaded pallet;
   d. a movable carriage supported on said article handling system for moving in a horizontal path over said slip sheet receiving means, said pallet elevator means and said conveyor means, said carriage being detailed to include a first and second support portion and wherein said first support portion is positioned over said slip sheet receiving means when said second support portion is positioned over said loaded pallet elevator means and wherein said first support portion is positioned over said loaded pallet elevator means when said second support portion is positioned over said conveyor means;
   e. means mounted on said first carriage support portions and operatively associated with a slip sheet separator for effecting a transfer of a slip sheet layer separator from said loaded pallet to said slip sheet receiving means during movement of said first carriage support portion from a position over said loaded pallet to a position over said slip sheet receiving means; and,
   f. means on said carriage second support portion operatively associated with a layer of articles on said loaded pallet for effecting a transfer of a layer of articles from said loaded pallet to said receiving conveyor during movement of said carriage second support portion from a position over said loaded pallet to a position over said receiving conveyor.

2. In an article handling system as described in claim 1, further characterized in that slip-sheet transfer means includes a series of suction cups supported thereon for engaging a layer separator slip-sheet in position on said loaded pallet and for transferring said layer separator sheet to said slip-sheet receiving means.

3. In an article handling system as describe in claim 1, further characterized in that said layer transfer means includes a mangetic pick-up head detailed in design for effecting a pick-up and transfer of a layer of articles from said loaded pallet to said receiving conveyor.

4. In an article handling system as described in claim 1, further characterized in that said series of conveyors are is detailed for conveying movement in the same direction as said second conveyor.

5. In an article handling system as described in claim 4, further characterized in that said conveyor means includes means operatively associated with said series of conveyors and said second conveyor for maintaining a group of said transferred articles in excess of the capacity of said second conveyor in conveying transferred relationship relative to said second conveyor whereby said excess articles will be successively transferred to said second conveyor means.

6. In an article handling system as described in claim 5, further characterized in that said maintaining means includes a series of conveyors supported relative to said second conveyor for operation in substantially parallel spaced relationship to said second conveyor and for conveying movement in an opposite direction from said second conveyor.

7. In an article handling system as described in claim 6, further characterized in that said second series of conveyors includes an article guide means operatively associated adjacent an outfeed end thereof for moving articles conveyed thereby onto said second conveying means and onto said first series of conveying means.

* * * * *